United States Patent
Ali et al.

(10) Patent No.: US 12,182,741 B2
(45) Date of Patent: Dec. 31, 2024

(54) SYSTEMS AND METHODS FOR ENHANCED TRANSPORTATION DISPATCH

(71) Applicant: Lyft, Inc., San Francisco, CA (US)

(72) Inventors: Rafah Mujtaba Ali, San Francisco, CA (US); Nihar Chandra Bhupalam, San Francisco, CA (US); Neil Rajiv Chainani, San Francsico, CA (US); Vincent Chih-Jye Chang, San Francisco, CA (US); Chirag Chhagan Chheda, San Carlos, CA (US); Philip Gerstoft, San Francisco, CA (US); Ilan Lobel, New York, NY (US); Jianzhe Luo, Bellevue, WA (US); Sebastien Martin, San Francisco, CA (US); Guy-Baptiste Richard de Capele d'Hautpoul, San Francisco, CA (US); Alexander Michael Weinstein, Seattle, WA (US)

(73) Assignee: Lyft, Inc., San Francisco, CA (US)

( * ) Notice: Subject to any disclaimer, the term of this patent is extended or adjusted under 35 U.S.C. 154(b) by 77 days.

(21) Appl. No.: 16/894,432

(22) Filed: Jun. 5, 2020

(65) Prior Publication Data
US 2021/0383296 A1    Dec. 9, 2021

(51) Int. Cl.
*G06Q 10/0631* (2023.01)
*G01C 21/34* (2006.01)
(Continued)

(52) U.S. Cl.
CPC ... *G06Q 10/06312* (2013.01); *G01C 21/3438* (2013.01); *G06F 16/29* (2019.01);
(Continued)

(58) Field of Classification Search
None
See application file for complete search history.

(56) References Cited

U.S. PATENT DOCUMENTS 9,769,616 B1 *   9/2017  Pao .................. H04W 4/023
10,121,287 B2 * 11/2018  Amin ............... G01C 21/3438
(Continued)

OTHER PUBLICATIONS

Zhong, Yixuan, et al., Achieving stable and optimal passenger-driver matching in ride-sharing system. 2018 IEEE 15th International Conference on Mobile Ad Hoc and Sensor Systems (Mass). IEEE, 2018 (Year: 2018).*

(Continued)

*Primary Examiner* — Darlene Garcia-Guerra
(74) *Attorney, Agent, or Firm* — Greenberg Traurig, LLP

(57) ABSTRACT

The disclosed computer-implemented method may include receiving an indication that a transportation application has been initialized on a computing device and analyzing current dispatch conditions affecting the dispatch of transportation provider devices to the computing device. The method may also include determining, based on the analysis, that the current dispatch conditions allow for an ephemeral ride mode to be offered on the transportation application. The method may further include instructing, based on the determination, the computing device to at least temporarily present the ephemeral ride mode within the transportation application as a selectable option. Various other methods, systems, and computer-readable media are also disclosed.

20 Claims, 11 Drawing Sheets

(51) Int. Cl.
  *G06F 16/29*   (2019.01)
  *G06Q 10/047*  (2023.01)
  *G06Q 50/40*   (2024.01)
(52) U.S. Cl.
  CPC ..... *G06Q 10/047* (2013.01); *G06Q 10/06315* (2013.01); *G06Q 10/06316* (2013.01); *G06Q 50/40* (2024.01)

(56) References Cited

U.S. PATENT DOCUMENTS

| | | | | |
|---|---|---|---|---|
| 10,248,913 | B1* | 4/2019 | Gururajan | G06Q 50/30 |
| 10,365,783 | B2* | 7/2019 | Bowden | G01C 21/367 |
| 2011/0301985 | A1* | 12/2011 | Camp | G06Q 50/30 |
| | | | | 705/7.29 |
| 2013/0297387 | A1* | 11/2013 | Michael | G06Q 30/02 |
| | | | | 705/13 |
| 2015/0248689 | A1* | 9/2015 | Paul | G06Q 50/30 |
| | | | | 705/14.23 |
| 2015/0302342 | A1* | 10/2015 | Yeh | G07B 13/00 |
| | | | | 705/7.15 |
| 2018/0054647 | A1* | 2/2018 | Tulabandhula | H04N 21/41407 |
| 2018/0089784 | A1* | 3/2018 | Yamashita | G06F 3/0485 |
| 2018/0101878 | A1* | 4/2018 | Marueli | G01C 21/3438 |
| 2019/0019146 | A1* | 1/2019 | Chraibi | G08G 1/202 |
| 2019/0057476 | A1* | 2/2019 | Zhang | G07B 15/00 |
| 2019/0383623 | A1* | 12/2019 | Aich | G06Q 10/047 |
| 2020/0304951 | A1* | 9/2020 | Beaurepaire | H04W 4/024 |
| 2020/0410555 | A1* | 12/2020 | ElShenawy | G06Q 30/0282 |
| 2021/0049714 | A1* | 2/2021 | Shaaban | G06Q 10/1093 |

OTHER PUBLICATIONS

Agaitz, Niels, et al. "Optimization for dynamic ride-sharing: A review." European Journal of Operational Research 223.2 (2012): 295-303 (Year: 2012).*

Liu, Yang, and Yuanyuan Li. "Pricing scheme design of ridesharing program in morning commute problem." Transportation Research Part C: Emerging Technologies 79 (2017): 156-177 (Year: 2017).*

Liu, Yifang, Will Skinner, and Chongyuan Xiang. "Globally-optimized realtime supply-demand matching in on-demand ridesharing." The World Wide Web Conference. 2019 (Year: 2019).*

Armant, Vincent, and Kenneth N. Brown. "Fast optimised ridesharing: Objectives, reformulations and driver flexibility." Expert Systems with Applications 141 (2020): 112914 (Year: 2020).*

* cited by examiner

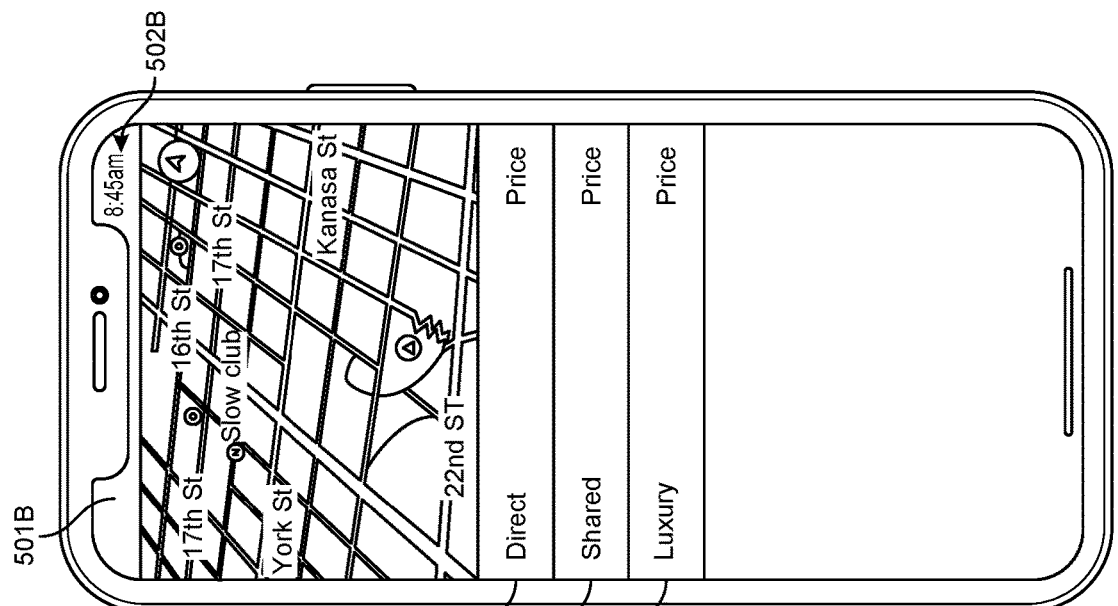
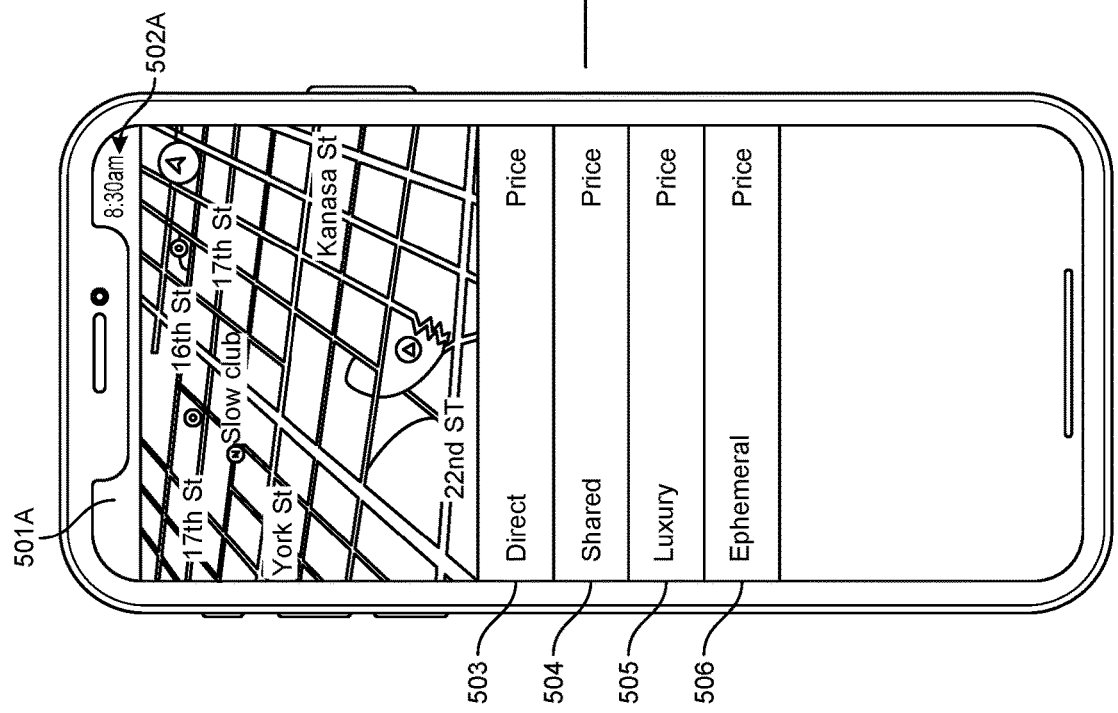
FIG. 5

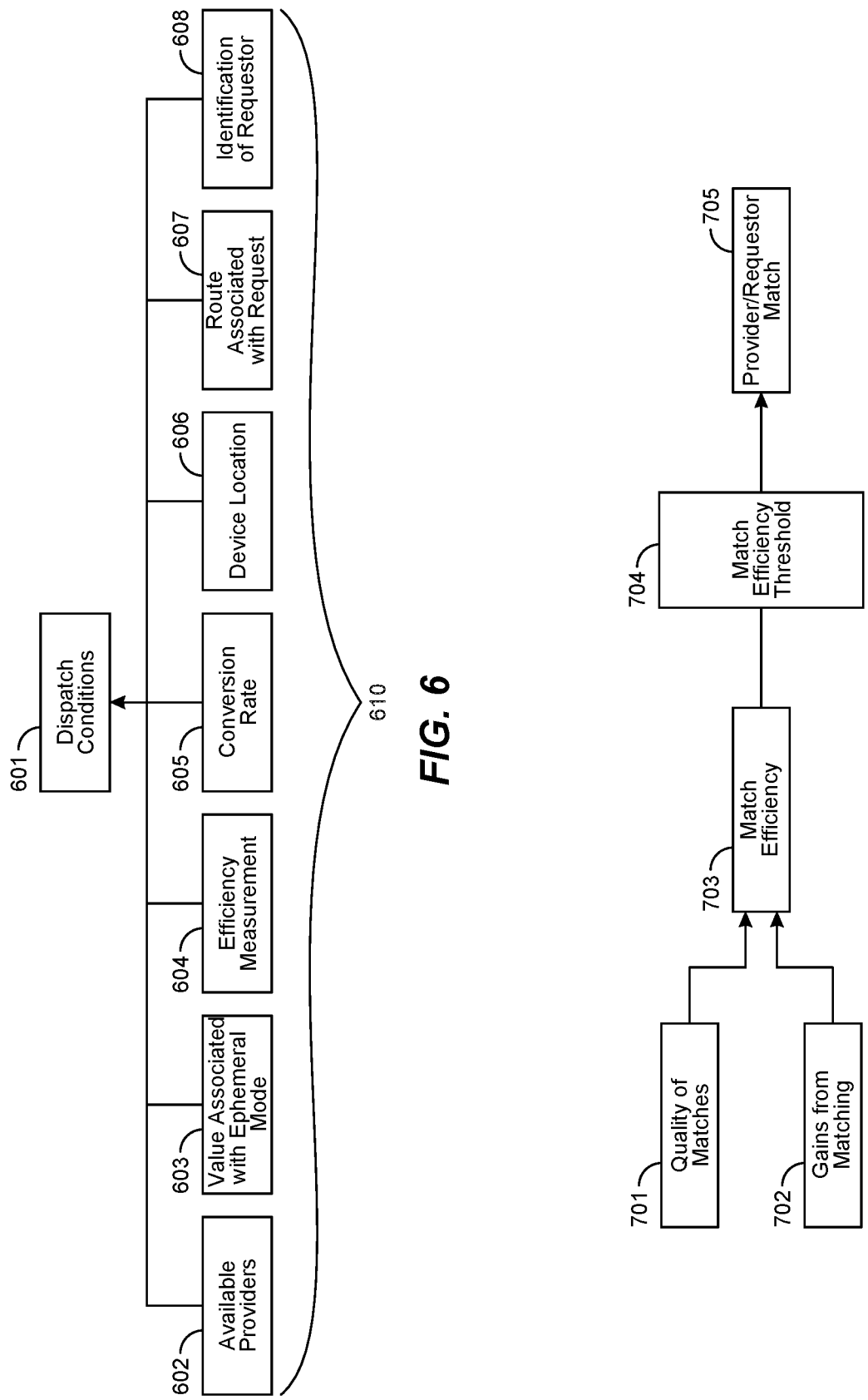

SYSTEMS AND METHODS FOR ENHANCED TRANSPORTATION DISPATCH

BACKGROUND

Transportation management systems are designed to allow transportation requestors to request and receive rides from transportation providers, enabling requestors to conveniently reach their destinations. Transportation management systems often offer a variety of different transportation options. For example, a transportation management system may offer both direct rides (i.e., an on-demand ride from a single point of origin to a single destination) and shared rides (i.e., a ride that allows multiple transportation requestors traveling in a similar direction to share the same vehicle for a reduced fee).

While transportation requestors often enjoy the cost-saving advantages of a shared ride, they may not like how shared rides can result in unpredictable ride lengths due to the detours involved in picking up or dropping off additional transportation requestors. In a shared ride, transportation providers often stop to pick up other riders and/or may not follow a direct route to the requestor's chosen destination. For example, when traveling to a requestor's destination, a transportation provider may take detours to pick up and/or drop off other riders before dropping off the original requestor.

Transportation requestors that choose shared rides may also experience uncertainty in their projected pickup time. For example, a transportation requestor may request a ride through a ridesharing application and the underlying transportation management system may indicate that the estimated time to be picked up by a provider for a direct ride is four minutes, while the estimated pickup time for a shared ride is seven minutes. In this example, the requestor may not be in a hurry and may consider the three-minute difference acceptable. As such, the requestor may select the shared ride option and may wait for their provider to arrive. In this example, however, the provider may need to drop off a current rider or may pick up another rider on the way to the requestor. As such, by the time the provider arrives, 10 minutes may have elapsed (instead of the original projection of seven), causing the requestor to feel frustrated. In addition, even after the requestor has been picked up and is en route to their destination, another shared ride request may come in and the provider may respond and accept that request, resulting in additional delays. Thus, in this example, when the requestor eventually arrives at their destination, they may feel irritated by the delays added to both their pickup and total travel time.

Accordingly, the present disclosure introduces the concept of an alternative shared ride mode that maintains the cost-saving advantages of a shared ride while removing much of the uncertainty and delays involved in sharing a ride with other transportation requestors.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5 is an illustration of an example embodiment in which an ephemeral ride mode is offered at one time of day but removed at another time of day.

FIG. 6 is an illustration of various dispatch conditions that may be considered when determining whether to offer the ephemeral ride mode.

FIG. 7 is an illustration of an example embodiment in which various efficiency metrics are evaluated when determining a provider/requestor match.

Figure 1:
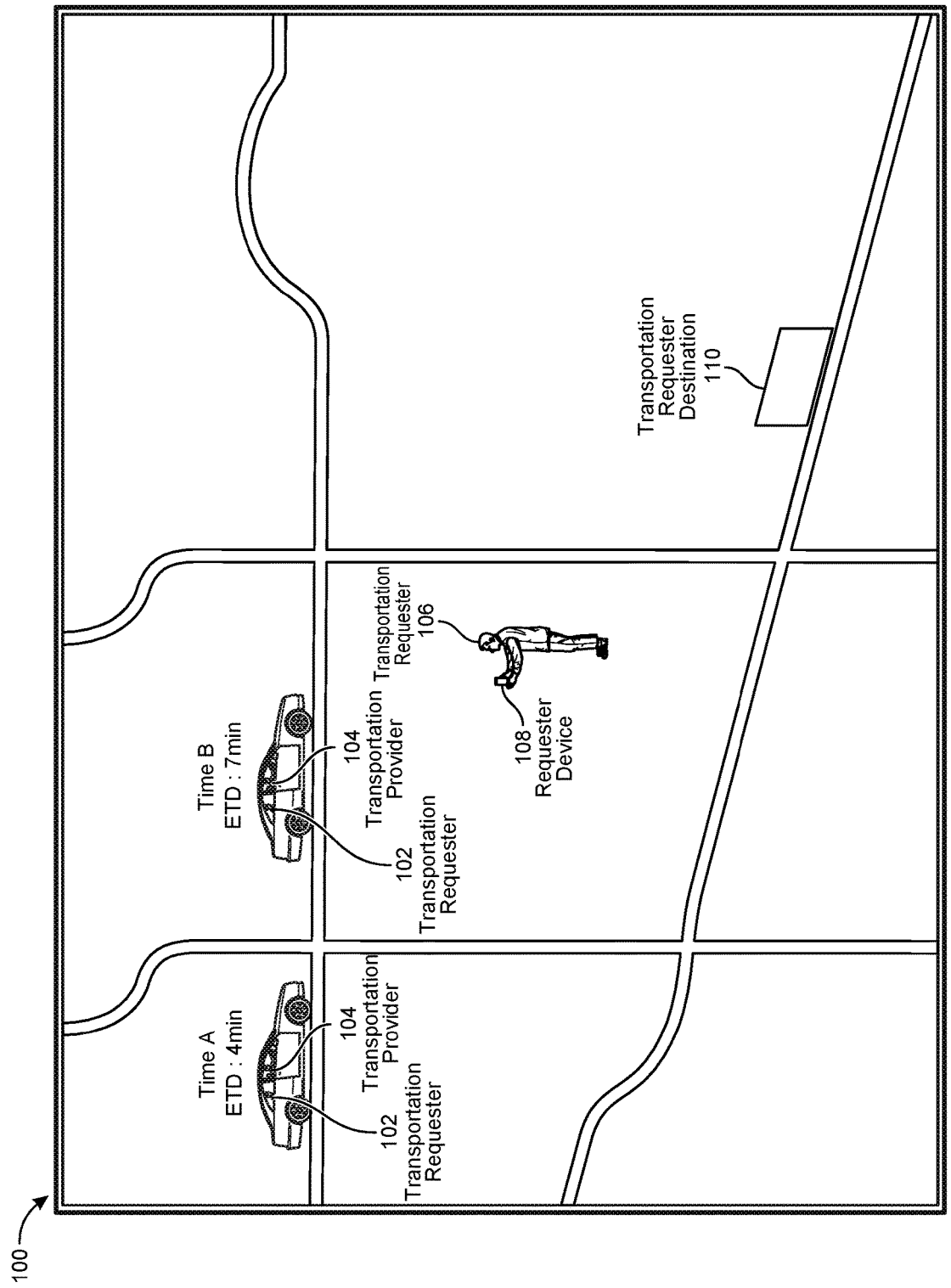
FIG. 1 is an illustration of an example scenario involving a single transportation provider and multiple possible transportation requestors.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As noted above, shared rides traditionally introduce a great deal of uncertainty regarding pickup time, drop-off time, and interim driving time. Unfortunately, this uncertainty may lead requestors to avoid shared rides and instead request direct rides or drive their own vehicles. This may, however, increase the number of vehicles on busy city streets, resulting in increased congestion, gasoline consumption, and/or air pollution. The underuse of shared rides may also result in reduced efficiency within the transportation management system, as each transportation requestor would need their own ride to their selected destination, even if other requestors may be traveling to the same (or a nearby) location. Grouping requestors together may reduce the number of vehicles and providers needed to provide rides within the system, which may in turn free up providers to provide rides to other requestors who may be waiting and may otherwise turn to other forms of transportation after long waits for an available provider.

In addition to any time or efficiency savings within the system, transportation requestors may want increased certainty in their shared ride. For instance, requestors may want to know that they will be picked up within, for example, five minutes and will be dropped off within eight minutes after pickup. Traditional shared ride offerings, however, cannot provide such guarantees. Thus, in at least some embodiments described herein, the disclosed transportation management system may provide an alternative shared ride mode or "ephemeral ride mode" that allows requestors to request a shared ride that satisfies tighter constraints on detours, estimated times of arrival (ETAS), and/or estimated times to destination (ETDs). Applying and enforcing these constraints may result in a more predictable ride experience for the transportation requestor. For instance, when evaluating potential matches within this ephemeral ride mode, the systems described herein may reject matches that would add a detour greater than X minutes (e.g., 5 minutes), or may reject matches that would increase the pickup ETA by more than Y minutes (e.g., 7 minutes), and/or may reject matches that would increase an ETA ratio (i.e., the remaining ETA minutes in a ride over the total ETA minutes initially quoted, as explained in greater detail below) by Z (e.g., by a ratio of 0.25).

In some examples, these constraints may be identified and applied on a per-requestor basis. In many traditional ride-sharing systems, constraints on shared rides are typically determined and applied on a city-wide or area-wide basis, with the same shared ride constraints being applied to all transportation requestors within that city or within that area. In some embodiments described herein, however, each transportation requestor may have individualized constraints that apply to their shared ride matches in the ephemeral ride mode. As such, some transportation requestors may have tighter constraints than others. Still further, these constraints (or different constraints) may be applied when determining whether to surface the ephemeral ride mode on a transportation matching application. For instance, in some cases, the ephemeral ride mode may only be presented in a transportation matching application (or simply "transportation application" herein) when certain criteria are met. In one case, for example, (referred to herein as "consistent ephemerality") the ephemeral ride mode may only be offered during certain times of the day (e.g., during the morning/evening commute), or may only be offered to certain transportation requestors, in certain cities, or on certain routes within an area.

In another example (referred to herein as "dynamic ephemerality"), the decision to offer the ephemeral ride mode within the transportation matching application may be determined in real time based on a variety of factors, including the number of available providers, the overall profitability of an ephemeral ride, the determined efficiency within the transportation management system, or other factors, some or all of which may be requestor-specific. If these factors indicate that the ephemeral ride mode is to be presented within the transportation matching application, the ephemeral ride mode may dynamically appear as a selectable option within the application. In some cases, the systems described herein may determine, based on a requestor's profile and/or ride history, the likelihood that the requestor will pay extra for a shared ride that has less uncertainty (i.e., fewer and/or shorter detours, shorter overall ETA, shorter pickup time, etc.). In such examples, this likelihood information may be considered as a factor when determining whether to offer the ephemeral ride mode to the transportation requestor. These concepts will be described in greater detail below with regard to FIGS. 1-12.

FIG. 1 is an illustration of an example scenario 100 in which a transportation requestor 102 requests a traditional shared ride to a destination 110, such as a house, a business, a park, or other location. In this example, a transportation management system (such as transportation management system 1102 in FIG. 11, discussed in greater detail below) may match transportation requestor 102 with a transportation provider 104 at time A. At time B, a different transportation requestor 106 may request a shared ride and may be matched with transportation provider 104.

At time A, the underlying transportation management system may have estimated (and indicated, via a transportation matching application, to the transportation requestor 102) that the estimated time to destination (ETD) (e.g., to destination 110) would be four minutes. However, after matching transportation requestor 106 (or the requestor's associated device 108) with transportation provider 104 at time B, the transportation matching system may revise the original ETD for transportation requestor 102 to seven minutes. Specifically, because transportation provider 104 will now need to make a detour to pick up transportation requestor 106, this detour will increase the amount of time needed for the transportation provider 104 to ultimately take the transportation requestor 102 to their destination 110. As such, at time B, the transportation management system may revise the requestor's ETD from four minutes to seven minutes, nearly doubling the originally estimated amount of time. In this situation, the transportation requestor 102 may be frustrated by the amount of time added to the original ETD. Moreover, if other shared requestors are matched with the transportation provider 104 on the way to destination 110, the ETD of the original requestor may be delayed even further.

As noted above, delays may also occur when a requestor is initially requesting a ride and is waiting to be picked up. For example, a transportation management system may initially estimate that a matched provider will pick up a requestor for a shared ride within eight minutes. In traditional systems, however, the provider may stop to pick up other transportation requestors, thus increasing the amount of time before the initial requestor is picked up. Thus, shared rides may cause uncertainty as to how much time will pass before the requestor is actually picked up. Moreover, after pickup, additional transportation requestors may be picked up and dropped off, leaving the initial requestor to wonder how much time will expire taking detours to pick up other requestors en route to the requested destination and/or how much time will expire before they are ultimately delivered to their destination. The embodiments described in FIGS. 2-9 may reduce this uncertainty by providing, in specific circumstances, an ephemeral ride mode that follows stricter constraints on requestor/provider matches to ensure that the requestor is picked up and arrives at their destination within a specified time window, even though the ride may be shared among multiple different transportation requestors.

As will be explained in greater detail below, in some examples the above-described concepts may leverage, utilize, and/or be implemented within a dynamic transportation management system. This dynamic transportation management system (sometimes referred to herein as a "transportation system" or "transportation management system") may arrange transportation on an on-demand and/or ad-hoc basis by, e.g., matching one or more transportation requestors and/or transportation requestor devices with one or more transportation providers and/or transportation provider devices. For example, a dynamic transportation management system may match a transportation requestor to a transportation provider that operates within a dynamic transportation network (e.g., that is managed by, coordinated by, and/or drawn from by the dynamic transportation management system to provide transportation to transportation requestors).

In some examples, available sources of transportation within a dynamic transportation network may include vehicles that are owned by an owner and/or operator of the dynamic transportation management system. Additionally or alternatively, sources of transportation within a dynamic transportation network may include vehicles that are owned outside of the dynamic transportation network but that participate within the dynamic transportation network by agreement. In some examples, the dynamic transportation network may include lane-bound vehicles (e.g., cars, light trucks, etc.) that are primarily intended for operation on roads. Furthermore, the dynamic transportation network may include personal mobility vehicles (PMVs) and/or micro-mobility vehicles (MMVs) that are not bound to traditional road lanes, such as scooters, bicycles, electric scooters, electric bicycles, and/or any other suitable type of PMV and/or MMV. In some embodiments, a dynamic transportation network may include autonomous vehicles (e.g., self-driving cars) that may be capable of operating with little or no input from a human operator.

Figure 2:
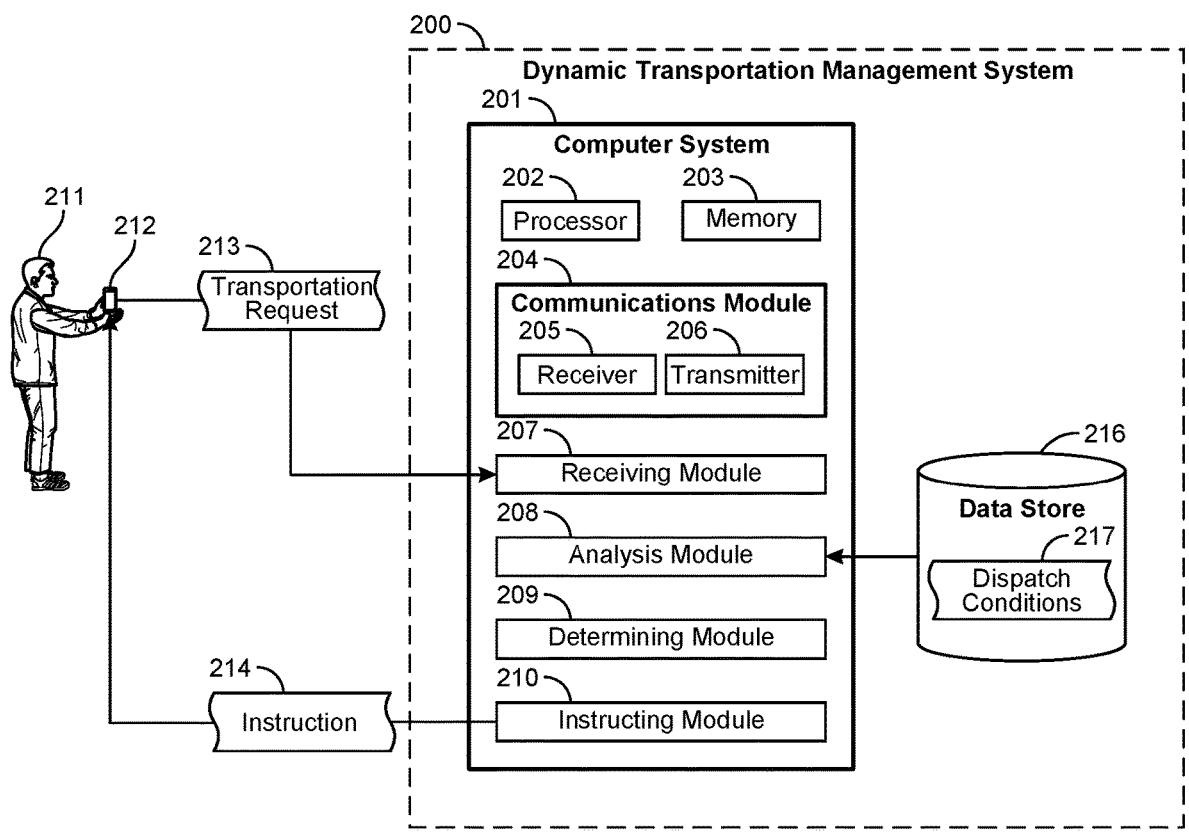
FIG. 2 is an illustration of an example architecture for generating and presenting an ephemeral ride mode.

FIG. 2 illustrates an embodiment of a dynamic transportation management system 200. The dynamic transportation management system 200, as described further below with regard to FIGS. 9 and 11-12, may be configured to facilitate ride sharing among transportation requestors and providers. The dynamic transportation management system 200 may include a computer system 201 with various modules for performing different tasks. The computer system 201 may include software modules, embedded hardware components such as hardware processors, or may include a combination of hardware and software. The computer system 201 may include substantially any type of computer system including a single, local computer system or a distributed (e.g., cloud) computer system with many different nodes.

In some cases, the computer system 201 may include at least one processor 202 and at least some system memory 203. The computer system 201 may include program modules for performing a variety of different functions. The program modules may be hardware-based, software-based, or may include a combination of hardware and software. Each program module may use computing hardware and/or software to perform specified functions, including those described herein below. The computer system 201 may also include a communications module 204 that is configured to communicate with other computer systems. The communications module 204 may include any wired or wireless communication means that can receive and/or transmit data to or from other computer systems. These communication means may include hardware interfaces including Ethernet adapters, WIFI adapters, and/or hardware radios including, for example, a hardware-based receiver 205, a hardware-based transmitter 206, or a combined hardware-based transceiver capable of both receiving and transmitting data. The radios may be cellular radios, Bluetooth radios, global positioning system (GPS) radios, or other types of radios. The communications module 204 may be configured to interact with databases, mobile computer devices (such as mobile phones or tablets), embedded systems, or other types of computer systems.

The computer system 201 may also include a receiving module 207. The receiving module 207 may be configured to receive data from various data sources including computing device 212. The computing device 212 may be a mobile or stationary computing device that is associated with a transportation requestor 211. The computing device 212 may include applications including a transportation matching application that allows the requestor to request rides through the dynamic transportation management system 200. The receiving module 207 of computer system 201 may be configured to receive the requestor's transportation requests 213. The transportation requests may include information identifying the transportation requestor 211 (or simply "requestor" herein), including their name and other identifying information such as their phone number, an application identifier, or perhaps their picture. The transportation request 213 may also include an indication of the requestor's destination and an indication of the selected ride mode (e.g., direct, shared, etc.).

Figure 3:
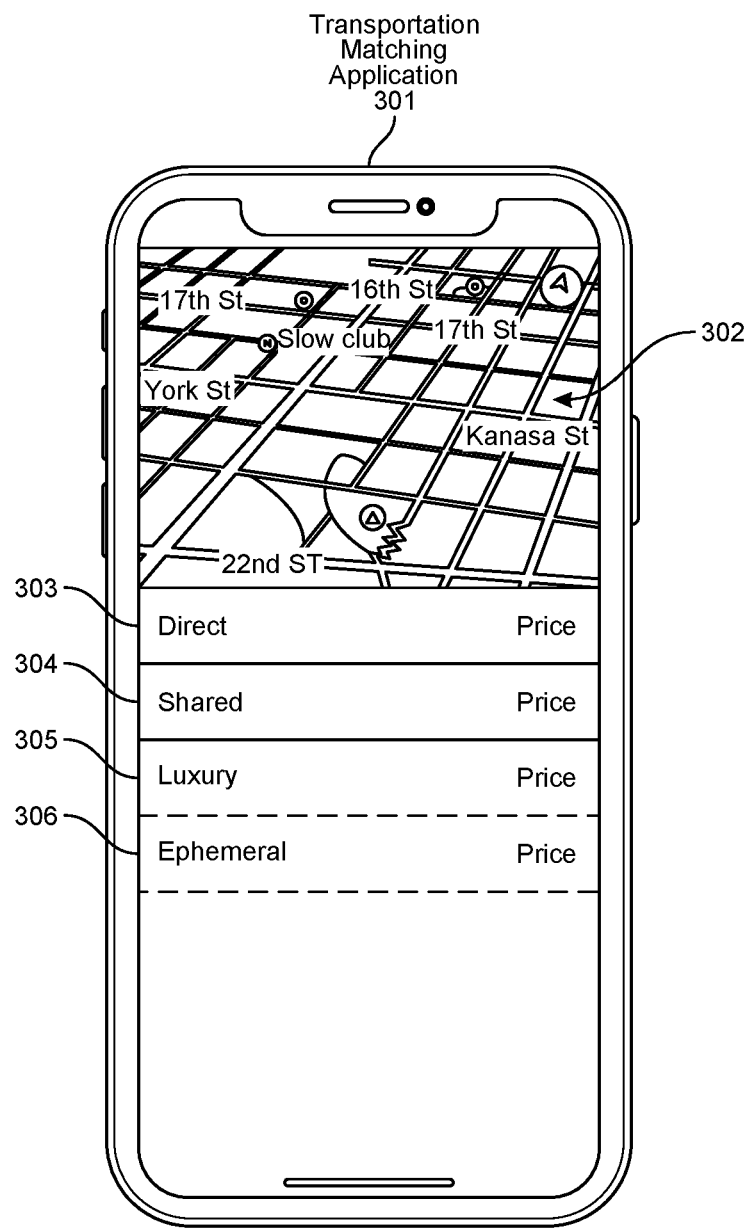
FIG. 3 is an illustration of an example transportation matching application displaying an ephemeral ride mode.

FIG. 3 is an illustration of an example transportation matching application 301 capable of presenting a variety of ride mode options to a transportation requestor (such as transportation requestor 211 in FIG. 2). As shown in FIG. 3, transportation matching application 301 may include a map showing the requestor's destination 302 (which, in this example, is near Kanasa St.). The transportation matching application 302 may display a variety of transportation options to the transportation requestor, including an option to request a direct ride 303 (in which a transportation provider picks up and drives the requestor directly to their destination without any other requestors, detours, or stops), an option to request a traditional shared ride 304 (in which a provider drives the requestor to their destination, but may stop or take detours to accommodate the transportation of other requestors or other items such as packages or meals), and/or an option to request a luxury ride 305 (which may be similar to a direct ride, but may be serviced either by a luxury vehicle or a larger or more specialized vehicle, such as a sport utility vehicle (SUV)). In some examples, the transportation matching application 302 may also display an ephemeral ride mode 306 that is only available at certain times or under certain conditions. As will be explained further below with regard to FIGS. 4-8, transportation matching application 302 may only display ephemeral ride mode 306 to certain requestors and/or only when certain criteria are met (such as when rides within certain time estimates can reasonably be provided).

Returning to FIG. 2, computer system 201 may also include an analysis module 208 that may be configured to analyze current dispatch conditions within the dynamic transportation management system 200. These dispatch conditions 217 may include substantially any factors, scenarios, considerations, or other conditions that may affect how transportation providers are dispatched to transportation requestors. The dispatch conditions 217 may indicate, for example, how many providers are located in a given region, how many requestors are requesting a specific destination, how many people are requesting direct rides as opposed to shared, luxury, or other rides, what the current weather is like, what the current traffic conditions are like, what the providers' and requestors' ride histories include (e.g., past trips to certain locations), indications of whether accidents or other events have occurred in a given area, or any other information that may affect how providers and requestors are matched together within the transportation management system. These dispatch conditions 217 may be streamed in real time to the computer system 201, or may be accessed from data store 216, which may be a local or remote data store.

In some cases, the determining module 209 of FIG. 2 may be configured to determine that the current dispatch conditions allow for an ephemeral ride mode to be offered on a specific transportation matching application. For instance, the determining module 209 may determine, based on an analysis of the current dispatch conditions 217, that an ephemeral shared ride mode may be offered on the requestor's computing device 212. The instructing module 210 may then provide an instruction 214 to the computing device 212 indicating that the ephemeral shared ride mode is to be presented by a transportation matching application running on the computing device 212. The ephemeral ride mode may then be displayed within the transportation application, as generally shown in FIG. 3. The determination of how and when to present this ephemeral shared ride mode will be explained further below with continued reference to the dynamic transportation management system 200 of FIG. 2.

Figure 4:
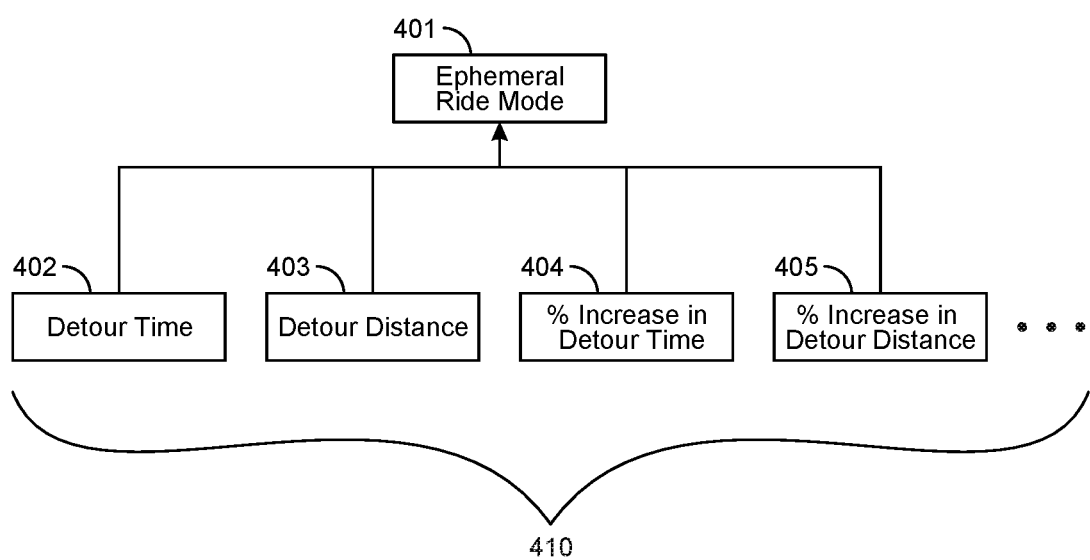
FIG. 4 is an illustration of various example factors that may be considered when presenting the ephemeral ride mode.

FIG. 4 is an illustration of various example factors that may be considered when presenting an ephemeral ride mode 401. In this example, the ephemeral ride mode 401 (which may be similar to ephemeral ride mode 306 in FIG. 3) may be offered when specified conditions occur. In some cases, the ephemeral ride mode 401 may represent an ephemeral ride mode that offers the transportation requestor (e.g., 211 of FIG. 2) an increased amount of certainty when requesting a shared ride. As noted above, transportation requestors that request shared rides are traditionally subject to a great amount of variance in estimated time to pick up, estimated time to drop-off, and estimated total travel time. In contrast, ephemeral ride mode 401 may conform to specific constraints that limit the amount of variability in the shared ride. The ephemeral ride mode 401 may thus allow the transportation requestor to share a ride with at least one other requestor subject to these constraints. In some cases, the constraints may be specific to the transportation requestor's device 212. These device-specific constraints may include a maximum potential detour time 402, a maximum potential detour distance 403, a maximum allowable percentage increase in length of detour time 404, or a maximum allowable percentage increase in length of detour distance 405, among other constraints.

For example, the maximum potential detour time 402 of FIG. 4 may be considered when determining whether to offer the ephemeral ride mode 401. In this example, the maximum potential detour time 402 may indicate an amount of time from when a transportation requestor initially departs from a direct route (i.e., a route that would directly take the transportation requestor 211 to their destination) until the transportation provider is back on the route to the requestor's destination. This detour may occur when picking up or dropping off another transportation requestor.

In some cases, the dynamic transportation management system 200 may take this amount of detour time into consideration when determining whether to offer the ephemeral ride mode 401 and/or when determining whether to present a transportation provider servicing a shared ride with the option to accept additional transportation requests. In traditional shared ride scenarios, the transportation requestor may be subject to substantially any detour time spent picking up or dropping off other shared transportation requestors. When using the ephemeral ride mode 401, however, a maximum potential detour time 402 may be established beyond which the ride may not pass. Thus, if the maximum potential detour time 402 is set at four minutes, the transportation management system may not present a transportation provider servicing the transportation requestor 211 with the option to accept transportation requests that would exceed the maximum potential detour time 402.

For example, if the transportation management system presents (via transportation matching application 301) transportation requestor 211 with the ephemeral ride mode 401 as an option, the requestor may be assured that their shared ride will not be detoured by more than four (or some other number of) minutes picking up other shared riders. In some examples, if the transportation management system is unable to identify matches (i.e., providers and/or additional requestors) that satisfy the constraints associated with transportation requestor 211, the transportation management system may not present the ephemeral ride mode 401 to the requestor as an option. For instance, in the above example, if there are no transportation providers that can provide a shared ride with less than four minutes of total detour time (and/or if there are no other requestors that be matched within these constraints), then the transportation management system may refrain from presenting ephemeral ride mode 401 as an option within the transportation matching application 301.

If, however, the transportation management system does surface the ephemeral ride mode 306 as an option within the transportation matching application 301, then the transportation management system will only present a transportation provider servicing this ephemeral ride with options to accept additional shared transportation requests that do not exceed the maximum potential detour time 402. Thus, the transportation management system may use the specified maximum potential detour time as a factor when determining whether to surface the ephemeral ride mode 401 as an option within the transportation matching application 301 and/or when determining whether to surface new shared ride requests to a transportation requestor currently servicing the ephemeral ride. The maximum potential detour time 402 may also serve as an indicator to the transportation requestor 211, identifying a constraint within which the transportation provider (and the larger dynamic transportation management system 200) is constrained to operate.

As with all the ephemeral ride mode constraints 410, the maximum potential detour time 402 may be specific to each transportation requestor (or to each electronic device associated with the transportation requestor). In other words, rather than having ridesharing constraints that apply to requestors within an entire region or area, each of the constraints 410 may be tailored for and specific to each transportation requestor. The maximum potential detour distance 403, for example, may be three miles for one requestor and five miles for another requestor. Each of these constraints may also be situationally specific, applying to certain requestors at certain times of day, or when the overall number of requests is sufficiently high, or when a sufficient number of people are traveling to the same location (e.g., a large outdoor event).

The maximum potential detour distance 403 may indicate the amount of detour distance a transportation provider may drive to pick up another shared transportation requestor. Again, as with the maximum potential detour time 402, the transportation management system may use the maximum potential detour distance 403 for the transportation requestor 211 as a factor when determining whether to present the ephemeral ride mode 306 within the transportation matching application 301. If the transportation management system is able to identify at least one match (i.e., providers and/or additional requestors) that satisfies this constraint (among one or more of the other constraints 410), then the transportation management system may show the ephemeral ride mode 306 in the transportation matching application 301 according to dynamic ephemerality. Still further, if the transportation requestor 211 has selected the ephemeral ride mode 306 from within the transportation matching application 301, the dynamic transportation management system 200 may only match those transportation providers that would be able to provide a shared ride within the constraints of the ephemeral ride mode 306.

The maximum allowable percentage increase in length of detour time 404 may refer to a constraint that specifies a percentage increase in the amount of detour time beyond which the ephemeral ride may not increase. For instance, if the transportation management system determines an initial constraint of five minutes detour time for a first transportation requestor that requested using the ephemeral (i.e., alternative shared) ride mode, and receives another transportation request from a transportation requestor that is traveling to a destination along the route of the initial requestor and would otherwise be matched with the same provider, if the amount of time needed to take a detour and pick up the second requestor is greater than a 20% (or some other percentage) increase (e.g., from five minutes to six minutes), then the transportation management system will not present the transportation provider with the option to match with the second requestor. Indeed, once a requestor requests a ride using the ephemeral ride mode, the constraints within which the ride was booked may stay with the requestor until the ride is complete. The transportation management system may not present to the provider of the ephemeral ride other potential rides that the transportation provider would normally be matched with to ensure that the ephemeral ride mode's constraints are met. Still further, as with the detour time and distance constraints 402 and 403, the transportation management system may not offer the ephemeral ride mode 401 to the requestor as an option within the transportation matching application 301 if there are no providers available that could provide the requested ride without exceeding the maximum allowable percentage increase in length of detour time 404, or if there are no other riders within a specified distance with whom the ride could be shared.

Like the maximum allowable percentage increase in length of detour time 404, the maximum allowable percentage increase in length of detour distance 405 may specify a percentage increase in the amount of detour distance beyond which the ride may not increase. If the maximum potential detour distance 403 is specified as four miles, and the maximum allowable percentage increase in length of detour distance 405 is 10%, the maximum detour distance to pick up another requestor, in this case, would be 0.4 miles. If another transportation requestor requests a ride and that requestor is more than 0.4 miles away, this would exceed the maximum allowable percentage increase in length of detour distance 405 of 10% (in this example) and, as such, the transportation management system would not present the option to pick up that other requestor as a shared rider. By not allowing the transportation provider to match with the other requestor, the transportation management system may uphold the original requestor's maximum allowable percentage increase in length of detour distance 405 constraint. Similarly, the transportation management system may not offer the ephemeral ride mode 401 to the requestor as an option within the transportation matching application if there are no providers available that could provide the requested ride without exceeding the maximum allowable percentage increase in length of detour distance 405, or if there are no riders that could be matched with the requestor without exceeding this maximum allowable percentage increase in length of detour distance 405.

Thus, at least in some cases, if no providers are able to provide a shared ride within a specified constraint, or if no other riders are able to join in a ride provided through the ephemeral ride mode within the specified constraint, or if other market conditions exist that would prevent providers from providing a ride within a group of specified constraints, the transportation management system may not present the ephemeral ride mode 401 as an option to the requestor. If, however, the ephemeral ride mode 401 is presented to and is selected by the requestor, the transportation management system may enforce that ride mode throughout the requestor's ride, such that other requestors can only be matched with the provider of the ride if those requests do not sufficiently increase the detour time, detour distance, or adversely affect another ride constraint under which the original ride was requested using the ephemeral ride mode 401.

In some cases, each transportation requestor may have their own estimated time to a specified destination that is customized for the transportation requestor (or customized to a computing device associated with the requestor) based on constraints that are specific to that requestor. In one case, for example, a requestor may have a maximum potential detour distance of 10 miles, while another requestor may have a maximum potential detour distance of six miles. Because the latter requestor has at least this one tighter constraint, the latter requestor may have fewer available providers that can provide a ride within the smaller, six-mile detour constraint and, as such, may have a different estimated time to destination (ETD) than the former requestor that has a larger, ten-mile detour constraint. Still further, because the latter requestor has at least this one tighter constraint, the latter requestor may have fewer other requestors nearby or on the same route that could potentially share the ride within the constraints of the ephemeral ride mode. In some cases, the transportation matching application 301 may present an indication of this estimated time and/or the associated constraints within the application.

FIG. 5 illustrates an embodiment in which the transportation management system presents an ephemeral ride mode 506 in some instances and refrains from presenting it in other instances. For example, in some cases, the transportation management system may present the ephemeral ride mode 506 according to a schedule that is specific to a transportation requestor or to a computing device associated with the transportation requestor. In the embodiment of FIG. 5, the transportation matching application 501A shows various ridesharing options including a direct ride 503, a shared ride 504, a luxury ride 505, and ephemeral ride mode 506 that may provide a ride within the constraints of the ephemeral ride mode. In some cases, this ephemeral ride mode 506 may be provided according to a time schedule which may vary by day, or may apply only on weekdays or on weekends. In this example, the transportation management system may offer the ephemeral ride mode 506 every weekday from 6:30-8:30 am. This schedule-based surfacing of the ephemeral ride mode 506 is referred to herein as "consistent ephemerality" herein, in that the ephemeral ride mode 506 is consistently provided (and removed) according to a timed schedule.

Thus, at least in this example, the transportation matching application 501A is displaying ephemeral ride mode 506 because the current time (8:30 am, as indicated by time indicator 502A) is within the specified time window. At a subsequent time (8:45 am, as indicated by time indicator 502B), the transportation matching application 501A may no longer offer the ephemeral ride mode 506. In some cases, the transportation matching application 501A may offer this ephemeral ride mode 506 within these specified time windows regardless of whether other constraint conditions are met. In other cases, even if the time window indicates that the ephemeral ride mode 506 should be surfaced within the transportation application (e.g., 501B), if one or more of the other constraints are not met, then the transportation matching application 501A will not show the ephemeral ride mode 506 in the application.

In some cases, the time schedule may be based on prior ride history data. For example, the dynamic transportation management system 200 of FIG. 2 may be configured to automatically determine a time schedule based on prior ride-history data associated with the transportation requestor (or the computing device associated with the transportation requestor). For example, if the transportation requestor 211 travels to work each morning between the hours of 6:30-8:30 am, the dynamic transportation management system 200 may determine, based on the ride-history data, that the transportation requestor prefers to take shared rides and prefers the tighter constraints provided by the ephemeral ride mode. Thus, the transportation management system may instruct the transportation matching application 501A to surface the ephemeral ride mode 506 during the hours of 6:30-8:30 am for that requestor. In this example, the transportation matching application 501A may present the ephemeral ride mode 506 when other dispatch conditions are met or, in some cases, even if other dispatch conditions are unmet.

FIG. 6, for example, illustrates one or more dispatch conditions that may or may not be met at any given time. These dispatch conditions 601 (which may be the same as or different than dispatch conditions 217 of FIG. 2) may serve as indicators to determine when the transportation matching application 501A is to present the ephemeral ride mode 506. One dispatch condition 601 may include an indication of available providers 602 (or computing devices associated with available providers). This may include transportation providers that are within a specified distance of a transportation requestor and have the ability to service the transportation request. This indicator of available providers 602 may be reduced, however, to providers that are not only within a specified distance, but are also able to provide a ride within the ephemeral ride mode constraints associated with that requestor, including maximum distance, maximum time, or maximum percentage increase in time and/or distance. Thus, whereas some transportation providers would be available for a traditional shared ride, these same providers may not be available to provide an ephemeral ride within the constraints established for the transportation requestor.

Another dispatch condition 601 may include the determined value 603 associated with the ephemeral ride mode. This may include a determination of the overall profitability of a shared ride provided through the ephemeral ride mode. In some cases, transportation requestors may be willing to pay more for shared rides that have limited detour time, limited detour distance, or are otherwise constrained more than usual to provide more certainty to the requestor regarding their ride. Thus, shared rides provided through the ephemeral ride mode may be subject to increased fees, which may provide more value to the transportation management system. These shared rides, however, may cause a provider to pass up a transportation requestor that they would otherwise pick up in a shared ride. Accordingly, the transportation management system may be configured to analyze the overall benefits to offering the ephemeral ride mode at any given time for a specific transportation requestor. Examples of these benefits may include profitability, requestor retention, provider efficiency (e.g., avoiding large groupings of providers in the same location), provider retention, or other benefits. These benefits may indicate an overall value of providing the ephemeral ride mode to a given requestor and, if that value is sufficient, the dispatch condition 603 may be satisfied and may indicate that the ephemeral ride mode should be surfaced on the transportation matching application.

Another dispatch condition 601 may include an efficiency measurement 604. The efficiency measurement 604 may indicate a measure of efficiency within the dynamic transportation management system 200. In some embodiments, the measure of efficiency may indicate a financial gain or an indication of profitability to the transportation management system. The efficiency measurement 604 may take into consideration the current location of available drivers, the transportation requestor's individual constraints within the ephemeral ride mode, and the amount of time, distance, or detour time needed to pick up and/or drop off the requestor. Each of these factors may increase or decrease the overall profitability of offering a ride via the ephemeral ride mode. In one embodiment, the efficiency measurement 604 may be based on a formula: ((amount_paid−provider_compensation)/amount_paid), where the closer the number is to one, the higher the match efficiency measurement 604 will be and, consequently, the higher the profitability will be to the transportation management system. As indicated by the variable names, the "amount_paid" is the amount paid by the transportation requestor to take a ride through the ephemeral ride mode (e.g., 506 of FIG. 5). The "provider_compensation" is the amount paid to the transportation provider for providing the ride requested through the ephemeral ride mode. As the number from this formula approaches one, the overall profitability of the ride increases. In some cases, this indication of profitability or efficiency is one of the dispatch conditions 601 considered when determining whether to offer the ephemeral ride mode 506 to a transportation requestor.

Another dispatch condition 601 that serves as a factor when determining whether to offer the ephemeral ride mode 506 is a measure of expected conversion rate 605. The measure of expected conversion rate 605 may indicate the rate at which the transportation management system (e.g., 200 of FIG. 2) expects transportation requestors to accept rides through the ephemeral ride mode 506. For instance, because not every ride that is requested is ultimately fulfilled, a conversion rate measurement exists to measure how many requested rides are ultimately completed or "converted." In this scenario, the expected conversion rate 605 may indicate the number of transportation requests that come via the ephemeral ride mode 506 that are ultimately converted. If the transportation management system determines that, for a given transportation request, that requestor is unlikely to complete the trip (e.g., the likelihood of completion is below a specified threshold level), the conversion rate dispatch condition may indicate that the ephemeral ride mode 506 should not be offered to that requestor. If, on the other hand, the likelihood is above the specified threshold, then the measure of expected conversion rate 605 may indicate that the ephemeral ride mode 506 should be offered to the requestor.

Still further, another dispatch condition 601 that may provide a bearing on whether to surface the ephemeral ride mode 506 for a given requestor may include the current location 606 of a computing device associated with the transportation requestor and/or the current location of a computing device associated with a transportation provider. For instance, the transportation management system may determine that a computing device associated with a transportation requestor is currently located in a specified city or in a specific part of that city. At that moment, there may be sufficient capacity in the way of available providers to provide rides within the constraints of the ephemeral ride mode 506. If the transportation requestor is in a more rural area, with fewer available providers, for example, the current location 606 dispatch condition 601 may indicate that there are insufficient providers to provide a shared ride within the ephemeral ride mode constraints associated with that transportation requestor. In such cases, the current location 606 may indicate that the requestor is in a location where the constraints of the ephemeral ride mode 506 cannot be met and, as such, the ephemeral ride mode 506 may not be surfaced in the requestor's transportation matching application. If, on the other hand, the requestor's current location places the requestor in an area with providers that could meet the ephemeral ride mode constraints associated with that transportation requestor, then the transportation matching application may surface the ephemeral ride mode 506 on the requestor's device.

A transportation requestor's destination and/or the route 607 to get to that destination may also have an effect on whether the transportation management system offers the ephemeral ride mode 506 on the transportation matching application. For instance, the transportation management system may determine that a transportation requestor (or a computing device associated with a requestor) is current located on a specified route 607 (e.g., on a route that leads to a local airport). Multiple other requestors may also want to take that route to the same or to a nearby destination. As such, being currently located on this route 607 may provide efficiencies within the transportation management system, allowing increased rider density per vehicle. Thus, in such cases, being located along a specific route 607 may be an indicator that the ephemeral ride mode 506 should be offered on the requestor's transportation matching application. If, however, the transportation requestor is located on a seldom-traveled route, this may indicate that few efficiencies will be gained by providing the ephemeral ride mode 506 and, as such, the transportation management system may not instruct the transportation matching application to provide the ephemeral ride mode 506 as an option.

The identity of the transportation requestor 608 may also be used as a dispatch condition 601 when determining whether to offer the ephemeral ride mode 506 as an option within the transportation matching application. For example, some requestors may be regular riders, while other requestors seldom take rides. Moreover, some requestors may be regular requestors of shared rides in particular. In some cases, the transportation management system may take into consideration who the transportation requestor is (i.e., the identity of the transportation requestor 608) and may look at their ride history, their conversion rate, their transportation request history, or other data that may indicate a willingness and a likelihood of using the ephemeral ride mode 506 if offered. Thus, in some cases, the identification of transportation requestor 608 may serve as a dispatch condition 601, indicating, based on the requestor's ride history or other associated data, that the ephemeral ride mode 506 is or is not to be offered in the transportation matching application. In some cases, after offering the ephemeral ride mode 506 to the requestor, and after the requestor accepting and converting rides through the ephemeral ride mode, the transportation matching application may surface the ephemeral ride mode more often to that requestor. In contrast, if the transportation matching application presents the ephemeral ride mode 506 to the requestor and they repeatedly ignore that offering, the identity of the requestor may indicate that this requestor is not interested in the ephemeral ride mode 506 and that it should no longer be offered as a transportation mode option.

Thus, the transportation management system may consider any or all of the various dispatch conditions 610 when determining whether to surface the ephemeral ride mode 506. In some cases, the transportation matching application may dynamically present ephemeral ride mode 506 upon the occurrence or upon meeting at least one of the thresholds of the various dispatch conditions. In some cases, for example, the transportation management system may consider dispatch conditions 602 and 603, while disregarding or subduing the influence of other dispatch conditions. In such an example, there may currently be a sufficient number of available providers 602 and the value 603 may be sufficiently high as to cause the ephemeral ride mode 506 to be dynamically displayed on the requestor's transportation matching application. Once these conditions are no longer met, the transportation management system may cause the ephemeral ride mode 506 to be dynamically removed from the application. In other cases, other dispatch conditions may be considered instead of or in addition to dispatch conditions 602 and 603.

Still further, in some embodiments, the transportation management system may weight some dispatch conditions more heavily than others. For instance, in some cases, the transportation management system may weigh the expected conversion rate 605 more heavily than the current location 606 or the current route 607. In other cases, the transportation management system may weigh the identity of the transportation requestor 608 more than the efficiency measurement 604. Thus, at different times, these dispatch conditions 610 may each have more or less weight when the transportation management system is determining whether to provide the ephemeral ride mode 506. Still further, the weighting of these conditions may, in some cases, overrule any time schedules associated with the offering of the ephemeral ride mode 506 that would otherwise surface the ephemeral ride mode 506 according to consistent ephemerality.

In such cases, for example, if the efficiency measurement 604 is sufficiently high, the transportation management system may offer the ephemeral ride mode 506, even if the time schedule would not indicate that the ephemeral ride mode 506 should be offered. In other cases, if the efficiency measurement 604 is sufficiently low, the transportation management system may not offer the ephemeral ride mode 506, even if the time schedule would indicate that the ephemeral ride mode 506 should be offered. Thus, this notion of dynamically presenting or removing the ephemeral ride mode 506 (referred to as "dynamic ephemerality" herein) may overrule any notions of consistent ephemerality. In other cases, the time schedule may overrule the conditions that would lead dynamic ephemerality to display the ephemeral ride mode 506. Accordingly, the transportation management system may take many different factors, conditions, and weightings into account when determining whether to surface the ephemeral ride mode 506 on a given requestors' transportation matching application.

In some cases, when the transportation management system is analyzing the current dispatch conditions 610 affecting the dispatch of transportation providers to the transportation requestor (or to their associated computing device), the analyzing may include calculating a match efficiency rating that indicates a determined value of matching the transportation requestor to a specific transportation provider.

The value of matching the requestor to a given provider may be based on various factors, as shown in FIG. 7.

For instance, as indicated in FIG. 7, the overall match efficiency rating 703 for a given provider/requestor match 705 may be affected by the quality of the match 701 and/or any financial, retention, or other gains 702 that may be realized by creating the provider/requestor match 705. In some cases, if the match efficiency rating 703 meets a minimum threshold value (e.g., 704), then the provider/requestor match 705 may occur; otherwise, the provider/requestor match 705 may not occur. The transportation management system may set the match efficiency threshold 704 for a given area, for a given date and time, and/or for an individual requestor. The transportation management system may increase or decrease the match efficiency rating 703 by the quality of the match 701. The quality of the match 701 may be based on how close the provider currently is to the requestor, how long it will take the provider to pick up and/or drop off the requestor at their selected destination, how long of a detour would be needed to pick up the requestor, the percentage increase in time or detour distance to a requestor who is already taking a shared ride in the provider's vehicle, or other indicators that would increase or decrease the quality of the potential provider/requestor match 705. Moreover, the match efficiency rating 703 may also be affected by various potential gains (or potential losses) from matching the requestor to the provider. These gains may include financial gains that may be realized if the match was made, including gains to the provider and/or to the transportation management system. The gains may also include retention gains, indicating that the provider and/or the requestor would be more likely to continue to use the transportation management system for ridesharing.

Using any combination of match quality 701 or determined gains 702, the transportation management system may determine a match efficiency rating 703. If that determined match efficiency rating indicates a specified increase in value (e.g., provides a minimum match efficiency to meet the match efficiency threshold 704), the provider and requestor may be matched together. In some cases, the requestor may be matched with the provider along with another item including another transportation requestor, a meal, a package, or other item.

Figure 8:
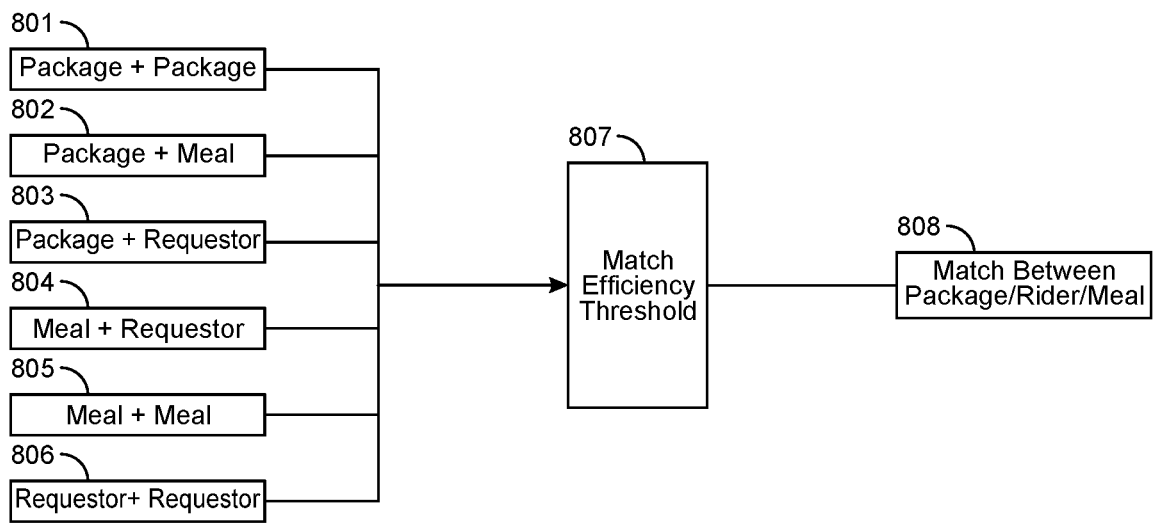
FIG. 8 is an illustration of an example embodiment in which different combinations of requestors, meals, and packages are considered when determining a match between a provider and a requestor, a package, or a meal.

For instance, as shown in FIG. 8, the transportation management system may match a given transportation requestor (or computing device associated with the transportation requestor) to share a ride with other items including a package or meal. For example, a package may need to be delivered from a pickup location to a drop-off location. If transporting that package provides sufficient value (e.g., quality 701 or gains 702), the provider may accept delivery of the package in addition to transporting one or more transportation requestors. Still further, a meal or other item may need to be delivered from a restaurant or store to a specified location. If transporting that meal or other item provides sufficient quality (e.g., 701) or gains (e.g., 702), the provider may deliver the meal or other item in addition to transporting the transportation requestors. In some cases, this match between different requestors, packages, meals or other items (e.g., match 808) may only be made if a minimum match efficiency threshold 807 is met. This match efficiency threshold 807 may be different based on the type of item or entity being transported.

Thus, for example, a package with another package 801 may have a certain match efficiency threshold 807 and may depend on the route, the pickup area, the drop-off area, the weight or size of the package, or other factors. If the value of delivering one package and being matched to another package (e.g., a shared ride for packages) is sufficiently high, the transportation management system may add the second package to the provider's queue. Similarly, other combinations may change the calculation of match efficiency and what is sufficient to meet the match efficiency threshold 807. A package plus a meal 802 may have a specified match efficiency or indication of profitability, while a package with a transportation requestor 803 may have a different match efficiency. The same applies for a meal plus a requestor 804, a meal plus a meal 805, or a requestor plus another requestor 806. Each scenario may have different factors or different weightings applied to those factors to determine whether a provider currently transporting a meal or a package or a requestor should accept another package, meal, requestor, or other item. In cases where the match efficiency is high enough to meet the match efficiency threshold 807, the match 808 may be made and the provider may proceed to pick up the additional package, meal, or requestor. In this manner, regardless of who or what is being transported, the transportation management system may verify each match to ensure that it provides sufficient value to the transportation management system to justify the match.

Figure 9:
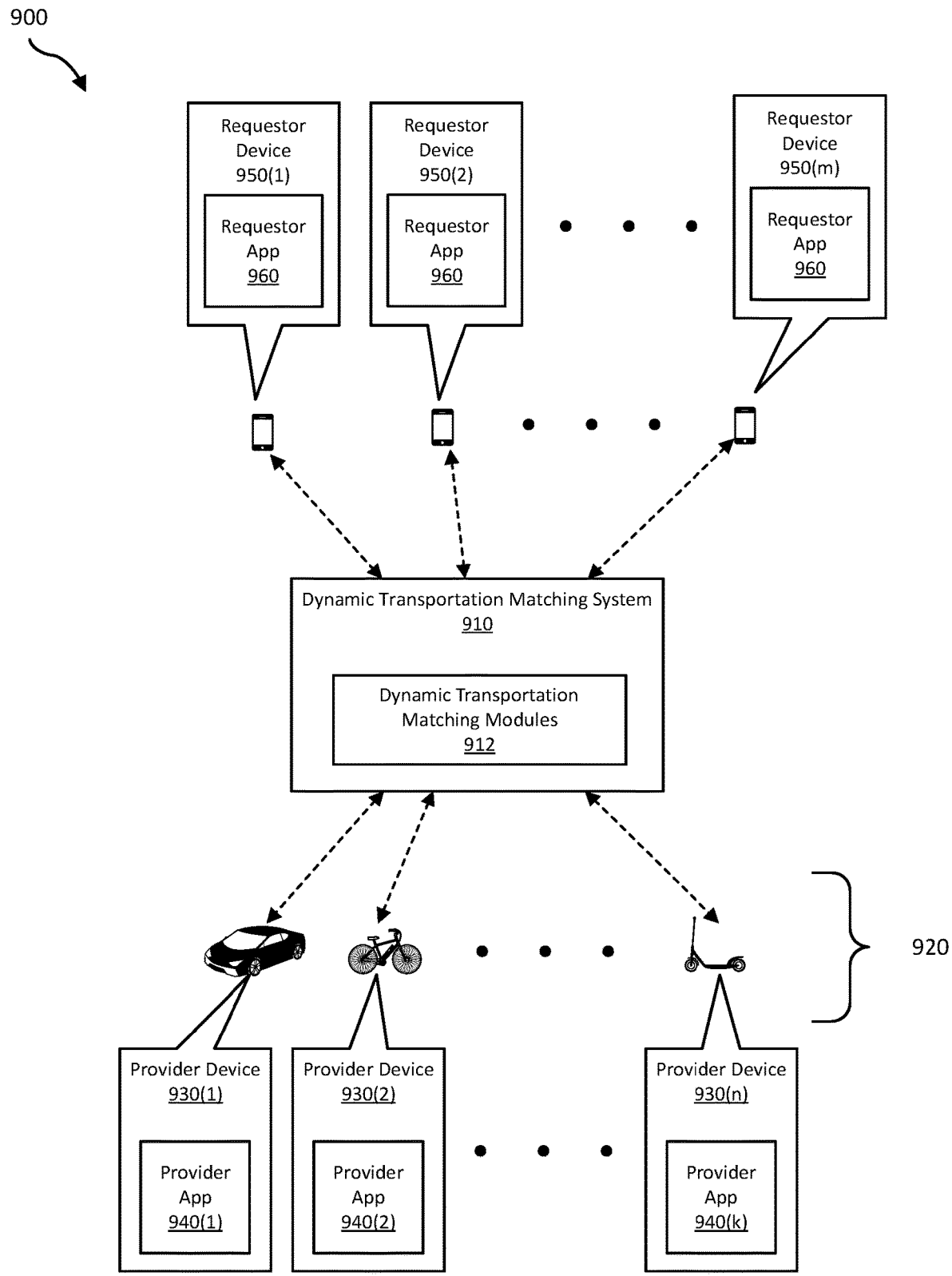
FIG. 9 is a block diagram of an example dynamic transportation management system.

FIG. 9 illustrates an example system 900 for matching transportation requests with a dynamic transportation network. As shown in FIG. 9, a dynamic transportation matching system 910 may be configured with one or more dynamic transportation matching modules 912 that may perform one or more of the steps described herein. The dynamic transportation matching system 910 may represent any computing system and/or set of computing systems capable of matching transportation requests. The dynamic transportation matching system 910 may be in communication with computing devices in each of a group of vehicles 920. The vehicles 920 may represent any vehicles that may fulfill transportation requests. In some examples, the vehicles 920 may include disparate vehicle types and/or models. For example, the vehicles 920 may include lane-bound vehicles and MMVs. In some examples, some of the vehicles 920 may be standard commercially available vehicles. According to some examples, some of the vehicles 920 may be owned by separate individuals (e.g., transportation providers). Furthermore, while, in some examples, many or all of the vehicles 920 may be human-operated, in some examples many of the vehicles 920 may also be autonomous (or partly autonomous). Accordingly, throughout the instant disclosure, references to a "transportation provider" (or "provider") may, where appropriate, refer to an operator of a human driven vehicle, an autonomous vehicle control system, an autonomous vehicle, an owner of an autonomous vehicle, an operator of an autonomous vehicle, an attendant of an autonomous vehicle, a vehicle piloted by a requestor, and/or an autonomous system for piloting a vehicle. While FIG. 9 does not specify the number of vehicles 920, it may be readily appreciated that the systems described herein are applicable to hundreds of vehicles, thousands of vehicles, or more. In one example, the dynamic transportation matching system 910 may coordinate transportation matchings within a single region for 50,000 vehicles or more on a given day. In some examples, the vehicles 920 may collectively form a dynamic transportation network that may provide transportation supply on an on-demand basis to transportation requestors.

As mentioned above, dynamic transportation matching system 910 may communicate with computing devices in each of the vehicles 920. The computing devices may be any suitable type of computing device. In some examples, one or more of the computing devices may be integrated into the respective vehicles 920. In some examples, one or more of the computing devices may be mobile devices. For example, one or more of the computing devices may be smartphones. Additionally or alternatively, one or more of the computing devices may be tablet computers, personal digital assistants, or any other type or form of mobile computing device. According to some examples, one or more of the computing devices may include wearable computing devices (e.g., a driver-wearable computing device), such as smart glasses, smart watches, etc. In some examples, one or more of the computing devices may be devices suitable for temporarily mounting in a vehicle (e.g., for use by a requestor and/or provider for a transportation matching application, a navigation application, and/or any other application suited for the use of requestors and/or providers). Additionally or alternatively, one or more of the computing devices may be devices suitable for installing in a vehicle and/or may be a vehicle's computer that has a transportation management system application installed on the computer in order to provide transportation services to transportation requestors and/or communicate with the dynamic transportation matching system 910.

As shown in FIG. 9, the vehicles 920 may include provider devices 930(1)-(n) (e.g., whether integrated into the vehicle, permanently affixed to the vehicle, temporarily affixed to the vehicle, worn by a driver of the vehicle, etc.). In some examples, provider devices 930 may include provider apps 940(1)-(k). The provider apps 940(1)-(k) may represent any application, program, and/or module that may provide one or more services related to operating a vehicle and/or providing transportation matching services. For example, the provider apps 940(1)-(k) may include a transportation matching application for providers and/or one or more applications for matching MMVs with requestor devices. In some embodiments, different types of provider vehicles may be provisioned with different types of provider devices and/or different provider applications. For example, MMVs may be provisioned with provider devices that are configured with a provider application that enables transportation requestors to reserve and/or operate the MMVs while road-constrained and/or lane-bound vehicles (e.g., cars) may be provisioned with provider devices that are configured with a provider application that enables provider vehicle operators (e.g., transportation providers) to respond to requests from transportation requestors. In some examples, the provider applications 940(1)-(k) may match the user of the provider apps 940(1)-(k) (e.g., a transportation provider) with transportation requestors through communication with dynamic transportation matching system 910. In addition, and as is described in greater detail below, the provider apps 940(1)-(k) may provide the dynamic transportation matching system 910 with information about a provider (including, e.g., the current location of the provider and/or vehicle) to enable the dynamic transportation matching system 910 to provide dynamic transportation matching and/or management services for the provider and one or more requestors. In some examples, the provider apps 940(1)-(k) may coordinate communications and/or a payment between a requestor and a provider. According to some embodiments, the provider apps 940(1)-(k) may provide a map service, a navigation service, a traffic notification service, and/or a geolocation service.

Additionally, as shown in FIG. 9, the dynamic transportation matching system 910 may communicate with the requestor devices 950(1)-(m). In some examples, the requestor devices 950 may include a requestor app 960. The requestor app 960 may represent any application, program, and/or module that may provide one or more services related to requesting transportation matching services. For example, the requestor app 960 may include a transportation matching application for requestors. In some examples, the requestor app 960 may match the user of the requestor app 960 (e.g., a transportation requestor) with transportation providers through communication with the dynamic transportation matching system 910. In addition, and as is described in greater detail below, the requestor app 960 may provide the dynamic transportation matching system 910 with information about a requestor (including, e.g., the current location of the requestor) to enable the dynamic transportation matching system 910 to provide dynamic transportation matching services for the requestor and one or more providers. In some examples, the requestor app 960 may coordinate communications and/or a payment between a requestor and a provider. According to some embodiments, the requestor app 960 may provide a map service, a navigation service, a traffic notification service, and/or a geolocation service.

Embodiments of the instant disclosure may include or be implemented in conjunction with a dynamic transportation matching system. A transportation matching system may arrange transportation on an on-demand and/or ad-hoc basis by, e.g., matching one or more transportation requestors with one or more transportation providers. For example, a transportation matching system may provide one or more transportation matching services for a networked transportation service, a ridesourcing service, a taxicab service, a car-booking service, an autonomous vehicle service, a personal mobility vehicle service, a micro-mobility service, or some combination and/or derivative thereof. The transportation matching system may include and/or interface with any of a variety of subsystems that may implement, support, and/or improve a transportation matching service. For example, the transportation matching system may include a matching system (e.g., that matches requestors to ride opportunities and/or that arranges for requestors and/or providers to meet), a mapping system, a navigation system (e.g., to help a provider reach a requestor, to help a requestor reach a provider, and/or to help a provider reach a destination), a reputation system (e.g., to rate and/or gauge the trustworthiness of a requestor and/or a provider), a payment system, and/or an autonomous or semi-autonomous driving system. The transportation matching system may be implemented on various platforms, including a requestor-owned mobile device, a computing system installed in a vehicle, a requestor-owned mobile device, a server computer system, or any other hardware platform capable of providing transportation matching services to one or more requestors and/or providers.

While various examples provided herein relate to transportation, embodiments of the instant disclosure may include or be implemented in conjunction with a dynamic matching system applied to one or more services instead of and/or in addition to transportation services. For example, embodiments described herein may be used to match service providers with service requestors for any service.

Figure 10:
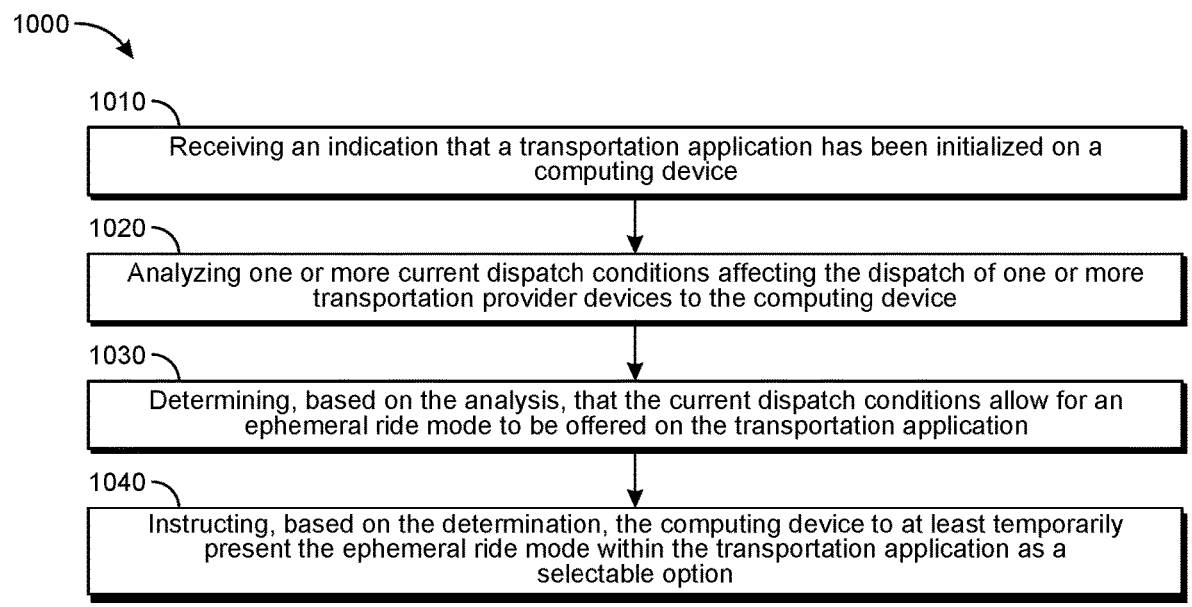
FIG. 10 is a flow diagram of an example method for generating and presenting an ephemeral ride mode.

FIG. 10 is a flow diagram of an exemplary computer-implemented method 1000 for generating and presenting an ephemeral ride mode. The steps shown in FIG. 10 may be performed by any suitable computer-executable code and/or computing system, including the systems illustrated in FIG. 2. In one example, each of the steps shown in FIG. 10 may represent an algorithm whose structure includes and/or is represented by multiple sub-steps, examples of which will be provided in greater detail below.

As illustrated in FIG. 10, at step 1010 one or more of the systems described herein may be configured to perform operations including receiving an indication that a transportation application has been initialized on a computing device. At step 1020, the system may analyze one or more current dispatch conditions affecting the dispatch of one or more transportation provider devices to the computing device. At step 1030, the system may determine, based on the analysis, that the current dispatch conditions allow for an ephemeral ride mode to be offered on the transportation application. And, at step 1040, the system may instruct, based on the determination, the computing device to at least temporarily present the ephemeral ride mode within the transportation application as a selectable option.

In some examples, the ephemeral ride mode may allow the computing device to share a ride with at least one other computing device subject to one or more device-specific constraints. In some embodiments, the device-specific constraints may include a maximum potential detour time, a maximum potential detour distance, a maximum allowable percentage increase in length of detour time, or a maximum allowable percentage increase in length of detour distance. In some cases, the ephemeral ride mode may provide an indication of an estimated time to a selected destination that is customized for the computing device based on the device-specific constraints.

In some embodiments, the ephemeral ride mode may be presented according to a schedule that is specific to the computing device. In some examples, the schedule is determined automatically based on prior ride-history data associated with the computing device. In some cases, the ephemeral ride mode is presented within the transportation application according to the schedule even if the current dispatch conditions are unmet.

In some examples, the current dispatch conditions may include one or more of the following: an indication of available transportation provider devices, an indication of profitability of a shared ride provided through the ephemeral ride mode, a measure of efficiency within a transportation management system, a measure of expected conversion rate, a determination that the computing device is currently located in a specified city, a determination that the computing device is currently located on a specified route, or identification of a transportation requestor associated with the computing device. In some cases, the ephemeral ride mode may be presented dynamically within the transportation application upon the occurrence of at least one of the current dispatch conditions.

In some embodiments, the step of analyzing the one or more current dispatch conditions affecting the dispatch of the one or more transportation providers to the computing device may include calculating a match efficiency rating that indicates a determined value of matching the computing device to at least one of the transportation provider devices. In some cases, the system may further determine that the calculated match efficiency rating meets a minimum threshold value and match the computing device to at least one of the transportation provider devices. In some examples, the determined match efficiency rating may indicate a specified increase in value for sharing a ride with at least one other item. In some cases, the computing device may be matched to share the ride with the at least one other item.

Figure 11:
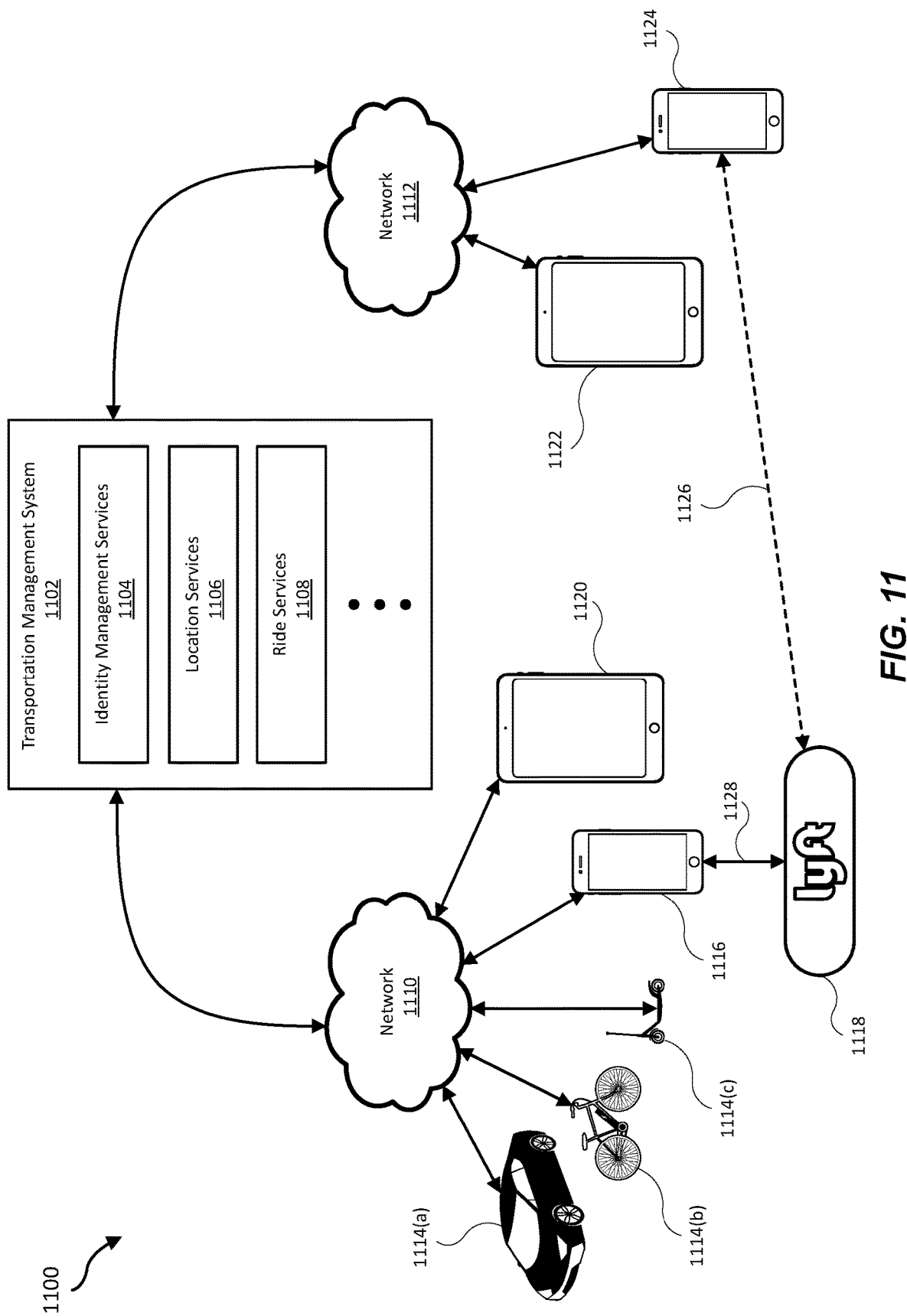
FIG. 11 is an illustration of an example requestor/provider management environment.

FIG. 11 shows a transportation management environment 1100, in accordance with various embodiments. As shown in FIG. 11, a transportation management system 1102 may run one or more services and/or software applications, including identity management services 1104, location services 1106, ride services 1108, and/or other services. Although FIG. 11 shows a certain number of services provided by the transportation management system 1102, more or fewer services may be provided in various implementations. In addition, although FIG. 11 shows these services as being provided by the transportation management system 1102, all or a portion of any of the services may be processed in a distributed fashion. For example, computations associated with a service task may be performed by a combination of the transportation management system 1102 (including any number of servers, databases, etc.), one or more devices associated with a provider (e.g., devices integrated with managed vehicles 1114(a), 1114(b), and/or 1114(c); the provider computing devices 1116 and tablets 1120; and the transportation management vehicle devices 1118), and/or more or more devices associated with a ride requestor (e.g., the requestor's computing devices 1124 and tablets 1122). In some embodiments, the transportation management system 1102 may include one or more general purpose computers, server computers, clustered computing systems, cloud-based computing systems, and/or any other computing systems or arrangements of computing systems. The transportation management system 1102 may be configured to run any or all of the services and/or software components described herein. In some embodiments, the transportation management system 1102 may include an appropriate operating system and/or various server applications, such as web servers capable of handling hypertext transport protocol (HTTP) requests, file transfer protocol (FTP) servers, database servers, etc.

In some embodiments, identity management services 1104 may be configured to perform authorization services for requestors and providers and/or manage their interactions and/or data with the transportation management system 1102. This may include, e.g., authenticating the identity of providers and determining that they are authorized to provide services through the transportation management system 1102. Similarly, requestors' identities may be authenticated to determine whether they are authorized to receive the requested services through the transportation management system 1102. Identity management services 1104 may also manage and/or control access to provider and/or requestor data maintained by the transportation management system 1102, such as driving and/or ride histories, vehicle data, personal data, preferences, usage patterns as a ride provider and/or as a ride requestor, profile pictures, linked third-party accounts (e.g., credentials for music and/or entertainment services, social-networking systems, calendar systems, task-management systems, etc.) and any other associated information. The transportation management system 1102 may also manage and/or control access to provider and/or requestor data stored with and/or obtained from third-party systems. For example, a requester or provider may grant the transportation management system 1102 access to a third-party email, calendar, or task management system (e.g., via the user's credentials). As another example, a requestor or provider may grant, through a mobile device (e.g., 1116, 1120, 1122, or 1124), a transportation application associated with the transportation management system 1102 access to data provided by other applications installed on the mobile device. In some examples, such data may be processed on the client and/or uploaded to the transportation management system 1102 for processing.

In some embodiments, the transportation management system 1102 may provide ride services 1108, which may include ride matching and/or management services to connect a requestor to a provider. For example, after identity management services 1104 has authenticated the identity a ride requestor, ride services 1108 may attempt to match the requestor with one or more ride providers. In some embodiments, ride services 1108 may identify an appropriate provider using location data obtained from location services 1106. Ride services 1108 may use the location data to identify providers who are geographically close to the requestor (e.g., within a certain threshold distance or travel time) and/or who are otherwise a good match with the requestor. Ride services 1108 may implement matching algorithms that score providers based on, e.g., preferences of providers and requestors; vehicle features, amenities, condition, and/or status; providers' preferred general travel direction and/or route, range of travel, and/or availability; requestors' origination and destination locations, time constraints, and/or vehicle feature needs; and any other pertinent information for matching requestors with providers. In some embodiments, ride services 1108 may use rule-based algorithms and/or machine-learning models for matching requestors and providers.

The transportation management system 1102 may communicatively connect to various devices through networks 1110 and/or 1112. Networks 1110 and 1112 may include any combination of interconnected networks configured to send and/or receive data communications using various communication protocols and transmission technologies. In some embodiments, the networks 1110 and/or 1112 may include local area networks (LANs), wide-area networks (WANs), and/or the Internet, and may support communication protocols such as transmission control protocol/Internet protocol (TCP/IP), Internet packet exchange (IPX), systems network architecture (SNA), and/or any other suitable network protocols. In some embodiments, data may be transmitted through the networks 1110 and/or 1112 using a mobile network (such as a mobile telephone network, cellular network, satellite network, or other mobile network), a public switched telephone network (PSTN), wired communication protocols (e.g., Universal Serial Bus (USB), Controller Area Network (CAN)), and/or wireless communication protocols (e.g., wireless LAN (WLAN) technologies implementing the IEEE 902.12 family of standards, Bluetooth, Bluetooth Low Energy, Near Field Communication (NFC), Z-Wave, and ZigBee). In various embodiments, the networks 1110 and/or 1112 may include any combination of networks described herein or any other type of network capable of facilitating communication across the networks 1110 and/or 1112.

In some embodiments, the transportation management vehicle device 1118 may include a provider communication device configured to communicate with users, such as drivers, passengers, pedestrians, and/or other users. In some embodiments, the transportation management vehicle device 1118 may communicate directly with the transportation management system 1102 or through another provider computing device, such as the provider computing device 1116. In some embodiments, a requestor computing device 1124 may communicate via a connection 1126 directly with the transportation management vehicle device 1118 via a communication channel and/or connection, such as a peer-to-peer connection, Bluetooth connection, NFC connection, ad hoc wireless network, and/or any other communication channel or connection. Although FIG. 11 shows particular devices communicating with transportation management system 1102 over networks 1110 and 1112, in various embodiments, the transportation management system 1102 may expose an interface, such as an application programming interface (API) or service provider interface (SPI) to enable various third parties which may serve as an intermediary between end users and the transportation management system 1102.

In some embodiments, devices within a vehicle may be interconnected. For example, any combination of the following may be communicatively connected: vehicle 1114, provider computing device 1116, provider tablet 1120, transportation management vehicle device 1118, requestor computing device 1124, requestor tablet 1122, and any other device (e.g., smart watch, smart tags, etc.). For example, the transportation management vehicle device 1118 may be communicatively connected to the provider computing device 1116 and/or the requestor computing device 1124. The transportation management vehicle device 1118 may establish communicative connections, such as connections 1126 and 1128, to those devices via any suitable communication technology, including, e.g., WLAN technologies implementing the IEEE 902.12 family of standards, Bluetooth, Bluetooth Low Energy, NFC, Z-Wave, ZigBee, and any other suitable short-range wireless communication technology.

In some embodiments, users may utilize and interface with one or more services provided by the transportation management system 1102 using applications executing on their respective computing devices (e.g., 1116, 1118, 1120, and/or a computing device integrated within vehicle 1114), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In some embodiments, the vehicle 1114 may include a vehicle-integrated computing device, such as a vehicle navigation system, or other computing device integrated with the vehicle itself, such as the management system of an autonomous vehicle. The computing device may run on any suitable operating systems, such as Android®, iOS®, macOS®, Windows®, Linux®, UNIX®, or UNIX®-based or Linux®-based operating systems, or other operating systems. The computing device may further be configured to send and receive data over the Internet, short message service (SMS), email, and various other messaging applications and/or communication protocols. In some embodiments, one or more software applications may be installed on the computing device of a provider or requestor, including an application associated with the transportation management system 1102. The transportation application may, for example, be distributed by an entity associated with the transportation management system via any distribution channel, such as an online source from which applications may be downloaded. Additional third-party applications unassociated with the transportation management system may also be installed on the computing device. In some embodiments, the transportation application may communicate or share data and resources with one or more of the installed third-party applications.

Figure 12:
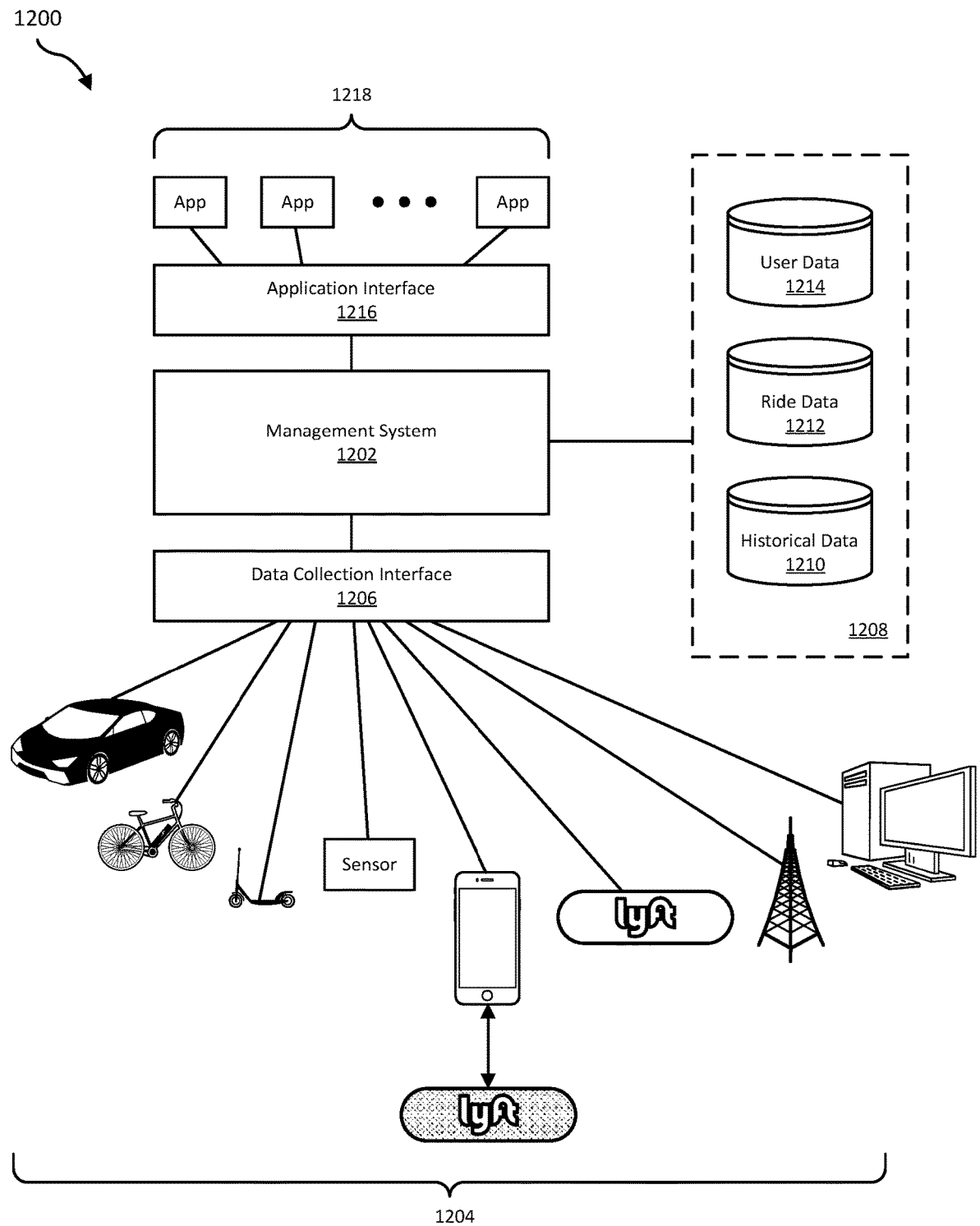
FIG. 12 is an illustration of an example data collection and application management system.

FIG. 12 shows a data collection and application management environment 1200, in accordance with various embodiments. As shown in FIG. 12, management system 1202 may be configured to collect data from various data collection devices 1204 through a data collection interface 1206. As discussed above, the management system 1202 may include one or more computers and/or servers or any combination thereof. The data collection devices 1204 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1206 can include, e.g., an extensible device framework configured to support interfaces for each data collection device. In various embodiments, the data collection interface 1206 may be extended to support new data collection devices as they are released and/or to update existing interfaces to support changes to existing data collection devices. In various embodiments, data collection devices may communicate with data collection interface 1206 over one or more networks. The networks may include any network or communication protocol as would be recognized by one of ordinary skill in the art, including those networks discussed above.

As shown in FIG. 12, data received from the data collection devices 1204 can be stored in data 1208. Data 1208 may include one or more data stores, such as databases, object storage systems and services, cloud-based storage services, and other data stores. For example, various data stores may be implemented on a non-transitory storage medium accessible to the management system 1202, such as historical data 1210, ride data 1212, and user data 1214. Data stores 1208 can be local to management system 1202, or remote and accessible over a network, such as those networks discussed above or a storage-area network or other networked storage system. In various embodiments, historical data 1210 may include historical traffic data, weather data, request data, road condition data, or any other data for a given region or regions received from various data collection devices. Ride data 1212 may include route data, request data, timing data, and other ride related data, in aggregate and/or by requestor or provider. User data 1214 may include user account data, preferences, location history, and other user-specific data, each of which may only be gathered, stored, and/or maintained in response to a user proactively agreeing or opting-in to the same. Although certain data stores are shown by way of example, any data collected and/or stored according to the various embodiments described herein may be stored in the data stores 1208.

As shown in FIG. 12, an application interface 1216 can be provided by the management system 1202 to enable various apps 1218 to access data and/or services available through management system 1202. Apps 1218 may run on various user devices (including provider and requestor computing devices, such as those discussed above) and/or may include cloud-based or other distributed apps configured to run across various devices (e.g., computers, servers, or combinations thereof). The apps 1218 may include, e.g., aggregation and/or reporting apps which may utilize data 1208 to provide various services (e.g., third-party ride request and management apps). In various embodiments, the application interface 1216 can include an API and/or SPI enabling third party development of the apps 1218. In some embodiments, the application interface 1216 may include a web interface, enabling web-based access to the data 1208 and/or services provided by the management system 1202. In various embodiments, the apps 1218 may run on devices configured to communicate with the application interface 1216 over one or more networks. The networks may include any network or communication protocol as would be recognized by one of ordinary skill in the art, including those networks discussed above, in accordance with an embodiment of the present disclosure.

Accordingly, in this manner, various systems and methods may be provided which are configured to determine when to provide an ephemeral ride mode option on a transportation matching application. This determination may take into account many different factors and weightings. Moreover, the determination may be specific to each transportation requestor. When the ephemeral ride mode is made available to a given requestor, that requestor may experience less uncertainty in their shared ride, as they may know the ride will be provided within certain restraints that limit the amount of time or distance that may be spent detouring to pick up other transportation requestors. This may increase the number of requestors that use shared rides and may thus increase rider density per vehicle. This may contribute to an improvement in the transportation management system by providing more transportation providers that are available to other users, and may reduce air pollution, road usage, gasoline usage, and may provide other benefits to the general public transportation system through reduced reliance on individual modes of transportation including personal cars.

While various embodiments of the present disclosure are described in terms of a networked transportation system in which the ride providers are human drivers operating their own vehicles, in other embodiments, the techniques described herein may also be used in environments in which ride requests are fulfilled using autonomous or semi-autonomous vehicles. For example, a transportation management system of a networked transportation service may facilitate the fulfillment of ride requests using both human drivers and autonomous vehicles. Additionally or alternatively, without limitation to transportation services, a matching system for any service may facilitate the fulfillment of requests using both human drivers and autonomous vehicles.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory. In one example, the memory device is a non-transitory memory device.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
   a non-transitory memory; and
   one or more hardware processors configured to execute instructions from the non-transitory memory to perform operations comprising:
   receiving an indication that a transportation application has been initialized on a computing device to request a shared ride, the computing device including a global positioning system (GPS) radio that provides dynamically updated, real time location information for the computing device, the shared ride including one or more ridesharing constraints that are to be maintained throughout the shared ride, wherein a separate set of tighter ridesharing constraints is implemented when determining whether to surface an ephemeral ride mode, the separate set of ridesharing constraints including additional restrictions that are only applied in the ephemeral ride mode;
   analyzing one or more current dispatch conditions affecting dispatch of one or more transportation provider devices to the computing device, wherein each transportation provider device includes a GPS radio configured to provide dynamically updated, real time location information for each transportation provider device;
   determining, based on the real time location of the computing device, based on the real time location of the transportation provider device, and based on the analysis, that the current dispatch conditions allow for the ephemeral ride mode to be offered on the transportation application, wherein the ephemeral ride mode is offered only if the shared ride constraints are determined to be enforceable throughout the duration of the shared ride and only if the separate set of ridesharing constraints with the additional restrictions has been met;
   instructing, based on the determination, the computing device to at least temporarily present the ephemeral ride mode within a user interface of the transportation application as a selectable option; and
   instructing the computing device to dynamically remove the ephemeral ride mode from the user interface upon determining, based on the real time location of the computing device or the real time location of the transportation provider device, that the shared ride constraints no longer apply, such that the ephemeral ride mode is automatically removed from the user interface of the transportation application on the computing device.

2. The system of claim 1, wherein the ephemeral ride mode allows the computing device to share a ride with at least one other computing device subject to one or more device-specific constraints.

3. The system of claim 2, wherein the device-specific constraints comprise at least one of:
   a maximum potential detour time;
   a maximum potential detour distance;
   a maximum allowable percentage increase in length of detour time; or
   a maximum allowable percentage increase in length of detour distance.

4. The system of claim 2, wherein the ephemeral ride mode provides an indication of an estimated time to a selected destination that is customized for the computing device based on the device-specific constraints.

5. The system of claim 1, wherein the ephemeral ride mode is presented according to a schedule that is specific to the computing device.

6. The system of claim 5, wherein the schedule is determined automatically based on prior ride-history data associated with the computing device.

7. The system of claim 5, wherein the ephemeral ride mode is presented within the transportation application according to the schedule even if the current dispatch conditions are unmet.

8. The system of claim 1, wherein the current dispatch conditions comprise at least one of:
an indication of available transportation provider devices;
an indication of profitability of a shared ride provided through the ephemeral ride mode;
a measure of efficiency within a transportation management system;
a measure of expected conversion rate;
a determination that the computing device is currently located in a specified city;
a determination that the computing device is currently located on a specified route; or
identification of a transportation requestor associated with the computing device.

9. The system of claim 8, wherein the ephemeral ride mode is presented dynamically within the transportation application upon the occurrence of at least one of the current dispatch conditions.

10. The system of claim 1, wherein the step of analyzing the one or more current dispatch conditions affecting the dispatch of the one or more transportation provider devices to the computing device includes calculating a match efficiency rating that indicates a determined value of matching the computing device to at least one of the transportation provider devices.

11. The system of claim 10, wherein the operations further comprise:
determining that the calculated match efficiency rating meets a minimum threshold value; and
matching the computing device to at least one of the transportation provider devices.

12. The system of claim 10, wherein the determined match efficiency rating indicates a specified increase in value for sharing a ride with at least one other item.

13. The system of claim 12, wherein the computing device is matched to share the ride with the at least one other item.

14. A computer-implemented method comprising:
receiving an indication that a transportation application has been initialized on a computing device to request a shared ride, the computing device including a global positioning system (GPS) radio that provides dynamically updated, real time location information for the computing device, the shared ride including one or more ridesharing constraints that are to be maintained throughout the shared ride, wherein a separate set of tighter ridesharing constraints is implemented when determining whether to surface an ephemeral ride mode, the separate set of ridesharing constraints including additional restrictions that are only applied in the ephemeral ride mode;
analyzing one or more current dispatch conditions affecting dispatch of one or more transportation provider devices to the computing device, wherein each transportation provider device includes a GPS radio configured to provide dynamically updated, real time location information for each transportation provider device;
determining, based on the real time location of the computing device, based on the real time location of the transportation provider device, and based on the analysis, that the current dispatch conditions allow for the ephemeral ride mode to be offered on the transportation application, wherein the ephemeral ride mode is offered only if the shared ride constraints are determined to be enforceable throughout the duration of the shared ride and only if the separate set of ridesharing constraints with the additional restrictions has been met;
instructing, based on the determination, the computing device to at least temporarily present the ephemeral ride mode within a user interface of the transportation application as a selectable option; and
instructing the computing device to dynamically remove the ephemeral ride mode from the user interface upon determining, based on the real time location of the computing device or the real time location of the transportation provider device, that the shared ride constraints no longer apply, such that the ephemeral ride mode is automatically removed from the user interface of the transportation application on the computing device.

15. The computer-implemented method of claim 14, wherein the ephemeral ride mode allows the computing device to share a ride with at least one other computing device subject to one or more device-specific constraints.

16. The computer-implemented method of claim 15, wherein the device-specific constraints comprise at least one of:
a maximum potential detour time;
a maximum potential detour distance;
a maximum allowable percentage increase in length of detour time; or
a maximum allowable percentage increase in length of detour distance.

17. The computer-implemented method of claim 15, wherein the ephemeral ride mode provides an indication of an estimated time to a selected destination that is customized for the computing device based on the device-specific constraints.

18. The computer-implemented method of claim 14, wherein the ephemeral ride mode is presented according to a schedule that is specific to the computing device.

19. The computer-implemented method of claim 18, wherein the schedule is determined automatically based on prior ride-history data associated with the computing device.

20. A non-transitory computer-readable medium comprising computer-readable instructions that, when executed by at least one processor of a computer, cause the computer to:
receive an indication that a transportation application has been initialized on a computing device to request a shared ride, the computing device including a global positioning system (GPS) radio that provides dynamically updated, real time location information for the computing device, the shared ride including one or more ridesharing constraints that are to be maintained throughout the shared ride, wherein a separate set of tighter ridesharing constraints is implemented when determining whether to surface an ephemeral ride mode, the separate set of ridesharing constraints including additional restrictions that are only applied in the ephemeral ride mode;
analyze one or more current dispatch conditions affecting dispatch of one or more transportation provider devices to the computing device, wherein each transportation provider device includes a GPS radio configured to provide dynamically updated, real time location information for each transportation provider device;
determine, based on the real time location of the computing device, based on the real time location of the transportation provider device, and based on the analysis, that the current dispatch conditions allow for the ephemeral ride mode to be offered on the transportation application, wherein the ephemeral ride mode is offered only if that the shared ride constraints are determined to be enforceable throughout the duration of the shared ride and only if the separate set of ridesharing constraints with the additional restrictions has been met;

instruct, based on the determination, the computing device to at least temporarily present the ephemeral ride mode within a user interface of the transportation application as a selectable option; and instruct the computing device to dynamically remove the ephemeral ride mode from the user interface upon determining, based on the real time location of the computing device or the real time location of the transportation provider device, that the shared ride constraints no longer apply, such that the ephemeral ride mode is automatically removed from the user interface of the transportation application on the computing device.

\* \* \* \* \*